US010533920B2

(12) United States Patent
Wascat et al.

(10) Patent No.: US 10,533,920 B2
(45) Date of Patent: Jan. 14, 2020

(54) AUTOMATIC ROTATING-MACHINE FAULT DIAGNOSIS WITH CONFIDENCE LEVEL INDICATION

(71) Applicant: 01dB-METRAVIB, Société par Actions Simplifiée, Limonest (FR)

(72) Inventors: Bertrand Wascat, Ecully (FR); Guillame Lavaure, Lyons (FR); Kamel Mekhnacha, Grenoble (FR); Patrick Labeyrie, Dardilly (FR); Thierry Mazoyer, Massieux (FR)

(73) Assignee: ACOEM France (FR)

(*) Notice: Subject to any disclaimer, the term of this patent is extended or adjusted under 35 U.S.C. 154(b) by 871 days.

(21) Appl. No.: 14/451,777

(22) Filed: Aug. 5, 2014

(65) Prior Publication Data

US 2016/0041070 A1  Feb. 11, 2016

(51) Int. Cl.
*G01M 7/00* (2006.01)
*G06N 7/00* (2006.01)

(52) U.S. Cl.
CPC .......... *G01M 7/00* (2013.01); *G06N 7/005* (2013.01)

(58) Field of Classification Search
CPC .... G01M 99/008; G01M 99/005; G01M 7/00; G01M 13/00; G06N 7/005; G07C 3/00; G05B 23/02
See application file for complete search history.

(56) References Cited

U.S. PATENT DOCUMENTS

| | | | |
|---|---|---|---|
| 5,566,092 A | * | 10/1996 | Wang ............... G05B 19/4184 |
| | | | 700/159 |
| 5,870,699 A | | 2/1999 | Canada et al. |
| 5,875,420 A | | 2/1999 | Piety et al. |
| 5,922,963 A | | 7/1999 | Piety et al. |
| 5,943,634 A | | 8/1999 | Piety et al. |
| 6,078,874 A | | 6/2000 | Piety et al. |
| 6,192,325 B1 | | 2/2001 | Piety et al. |
| 7,142,990 B2 | | 11/2006 | Bouse et al. |
| 7,313,484 B2 | | 12/2007 | Lindberg et al. |
| 7,324,919 B2 | | 1/2008 | Lindberg et al. |
| 7,458,269 B2 | | 12/2008 | Loesl et al. |

(Continued)

OTHER PUBLICATIONS

Czarnecki, Weighted Tanimoto Extreme Learning Machine with Case Study in Drug Discovery, Dec. 27, 2012, IEEE, pp. 1-11.*

(Continued)

*Primary Examiner* — Lisa E Peters
(74) *Attorney, Agent, or Firm* — Jordan and Koda, PLLC

(57) ABSTRACT

Automatic fault diagnosis is performed on vibration data sensed from a machine. A set of faults to screen for is identified from the machine configuration. For each fault there are characteristic symptoms. For each characteristic symptom, there is a corresponding indication used to diagnose the symptom. The indications are based on analyses of the current vibration data. The diagnosed symptoms have weights assigned according to a Bayesian network, and are used to derive a Bayesian probability for the fault. A fault having a Bayesian probability exceeding a threshold value is identified as being present in the machine. For each fault a confidence level is derived. The confidence level for a first fault is based on a similarity between characteristic symptoms for the first fault and characteristic symptoms for each one of the other faults being screened.

18 Claims, 13 Drawing Sheets

(56) References Cited

U.S. PATENT DOCUMENTS

| | | | |
|---|---|---|---|
| 7,711,519 B2 | 5/2010 | Lindberg et al. | |
| 7,805,281 B2 | 9/2010 | Leigh | |
| 8,174,402 B2 | 5/2012 | Bouse et al. | |
| 8,370,109 B2 | 2/2013 | Van Dyke et al. | |
| 2003/0040878 A1* | 2/2003 | Rasmussen | G01D 3/08 702/85 |
| 2003/0045976 A1* | 3/2003 | Bechhoefer | G01H 1/003 701/30.2 |
| 2005/0043922 A1* | 2/2005 | Weidl | G06N 7/005 702/183 |
| 2008/0201104 A1* | 8/2008 | Poncet | G05B 23/0229 702/181 |
| 2009/0150323 A1* | 6/2009 | Hively | G06N 99/005 706/50 |
| 2011/0290024 A1* | 12/2011 | Lefler | G01H 1/003 73/579 |
| 2014/0121996 A1 | 5/2014 | Piety et al. | |
| 2014/0222378 A1* | 8/2014 | Piety | G05B 23/02 702/183 |
| 2015/0219530 A1* | 8/2015 | Li | G05B 23/0243 702/181 |

OTHER PUBLICATIONS

Zhang, Asset health reliability estimation based on condition data, 2007, Proceedings World Congress on Engineering Asset Management, pp. 1-10.*

* cited by examiner

AUTOMATIC ROTATING-MACHINE FAULT DIAGNOSIS WITH CONFIDENCE LEVEL INDICATION

RELATED SPECIFICATION

This application is related to commonly-assigned, U.S. patent application Ser. No. 14/451,718 of Wascat et al. filed on Aug. 5, 2014 for "Wireless Collection and Analysis of Machine Data," and is incorporated herein in its entirety by reference.

BACKGROUND OF THE INVENTION

This invention relates generally to the collection and analysis of machine diagnostic data, such as vibration data, temperature, and rotation speed. More particularly, this invention relates to methods and apparatus for automatically performing machine diagnosis on site during machine diagnostic data collection.

Many types of machines are used in a production or manufacturing facility, such as in the production of consumer and industrial goods and in the delivery of basic utility services. Because of the importance of these machines in meeting production and service requirements, taking a machine offline unexpectedly due to a failure can be costly. Accordingly, it is desirable to implement an effective predictive maintenance program to keep the machines in good working condition. Of concern is that a machine part that is moving or being moved against may result in decreased machine performance and reliability. Eventually if a deteriorating condition is not detected a failure may occur. Examples of such machines for which it is desirable to collect data for preventive maintenance are motors, pumps, generators, compressors, lathes and other machines having rotating or other moving parts, such as a shaft, rotor, or bearings.

Most predictive maintenance programs include the periodic collection of machine data, such as vibration data, rotation speed, and temperature. Vibration data is sensed using an accelerometer. Rotation is sensed by a tachometer. Temperature is sensed with a temperature sensor. Analysis of collected data to diagnose a machine typically has required special expertise. As an industrial trend, however, there are fewer technicians able to analyze machine diagnostic data for predicting faults and for identifying a need to perform machine maintenance so as to avoid unexpected failures of rotating machines.

Accordingly, there is a need for automatic analysis of collected machine diagnostic data. These and other needs are addressed by various embodiments of the present invention.

SUMMARY OF THE INVENTION

Automatic fault diagnosis is performed on machine diagnostic data, including vibration data, sensed from a rotating machine. When a fault is detected a severity and confidence level are provided for such fault. The severity is based on a Bayesian probability calculated for the fault. The confidence level is based on a similarity between characteristic symptoms to be diagnosed for the fault and characteristic symptoms to be diagnosed for other faults of the machine. The greater the dis-similarity between sets of characteristic symptoms the more confidence that the diagnosed fault is actually present in the machine. Among the benefits of the severity and confidence level indications is that they result in warnings and recommendations advising a less experienced technician on when to seek assistance from more a experienced technician having expertise in vibration analysis.

According to the invention, machine configuration information adapted for a given machine is used to identify a set of fault defect assumptions for that machine. The presence or lack of presence of components corresponds to specific fault defect assumptions. For example, a machine having a pump will have a fault defect assumption for a cavitation fault; a machine having a gearbox will have a fault defect assumption for a gear defect.

For each fault among the set of fault defect assumptions identified for a given machine, there is a set of predetermined characteristic symptoms. Each characteristic symptom for a given fault is screened to determine a probability of whether the symptom is present. For each symptom there is a corresponding indicator or set of one or more indicators. The indicators are resolved for the corresponding fault to achieve resolved indicator values. The indicator value(s) are tested against criteria to determine a probability for the symptom. There also is a weight associated with each symptom for a given fault. Such weight is determined according to a naive Bayesian network. The same symptom may have a different weight in connection with the diagnosis of a different type of fault of the same machine, according to the naive Bayesian network for such other fault. The symptom probability and symptom weight are used to compute a Bayesian probability for the fault being present, which is interpreted to provide an indication of fault severity. When the computed probability of the fault is less than a threshold value (e.g., 50%) the fault is not diagnosed as present in the machine.

According to the present invention, the confidence level of a fault is one minus the sum of weighted similarity factors between such fault and all the other faults among those identified by the fault defect assumptions for the current machine. The confidence level derivation for a given fault involves determining the similarity between the characteristic symptoms of the given fault and those of each other fault. The similarity between a first fault and a second fault is a ratio of a value based on the intersection of characteristic symptoms and a value based on the union of characteristic symptoms for the two faults. Such similarity is weighted by the Bayesian probability (i.e., determined severity) of the second fault to determine the second fault's influence on the confidence level of the first fault. The similarity contributions regarding each other fault are similarly calculated. Because a high similarity is less indicative of confidence that the first fault is actually present, the value 1—the sum of the similarity contributions for each other fault (i.e., dis-similarity) is used to report the confidence level for a given fault.

In comparison to simple automatic fault detection, in which vibration data merely is compared to thresholds and therefore is more subject to being inaccurate, a severity indication and confidence level for a fault diagnosis that bases the evaluation for one fault not just on the one fault but also on the other faults provides a more reliable indication of whether the machine's overall health is in need of preventive maintenance. The inventive approach increases reliability of recommendations, particularly when confidence levels from multiple faults are presented together. The technician can modify the recommendation made based on one fault, for example, to account for a lack of confidence or an absence of another expected fault. For example, if the one fault were serious, then the other faults would be expected. But low confidence in those other faults means the one fault may be suspect and the preventive maintenance might be delayed pending further investigation.

According to the invention, a machine diagnostic data collection system is configured to perform machine diagnostic data collection, automatic diagnosis, and fault diagnosis. Select measurements from among the raw sensor data, along with select results of the automatic diagnosis serve as the range of indicators that are used in connection with symptoms for diagnosing machine faults.

According to an embodiment of an invention herein, setup instructions include for some test points a standard graphic image or custom photograph showing the correct sensor positioning on the machine and the correct orientation of the sensor unit relative to the machine, (e.g., for properly aligning axes of a tri-axial sensor of an embodiment of the sensor unit.

An advantage of the invention is that fault diagnosis based on probability to provide a severity and confidence indication allows technicians without expertise to receive on site at the time of data collection recommendations and warnings on whether to perform maintenance without first consulting a more experienced technician. For example for diagnosed faults determined to have a low confidence level, additional warnings are presented to the technician suggesting the technician request a complementary analysis by an expert technician to confirm the defect before taking any maintenance action.

Another advantage is that for technicians having expertise in vibration analysis, the automatic confidence level determination allows them to distinguish between less complex and more complex diagnostic analysis issues, and thereby focus their attention on the complex issues requiring their expertise. Accordingly, automatic diagnosis and probabilistic-based fault detection saves time for inexperienced, competent and expert level technicians in the field of vibration analysis, and promotes more efficient and effective machine diagnosis.

The inventions will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details may be set forth, such as particular terminals, devices, components, techniques, protocols, interfaces, hardware, etc. in order to provide a thorough understanding of the present invention. However, it will be apparent to one skilled in the art that the present invention may be practiced in other embodiments that depart from these specific details. Detailed descriptions of well-known computers, terminals, devices, phones, components, techniques, protocols, interfaces, and hardware are omitted so as not to obscure the description of the present invention. Accordingly, computer components and other components, protocols, and interfaces, known to one of ordinary skill in the art of machine vibration data collection and analysis are intended to be inferred into the detailed description. The terms fault and defect are used interchangeably herein, and are not intended to have a different meaning.

Machine Diagnostic Data Collection and Analysis System

Figure 1:
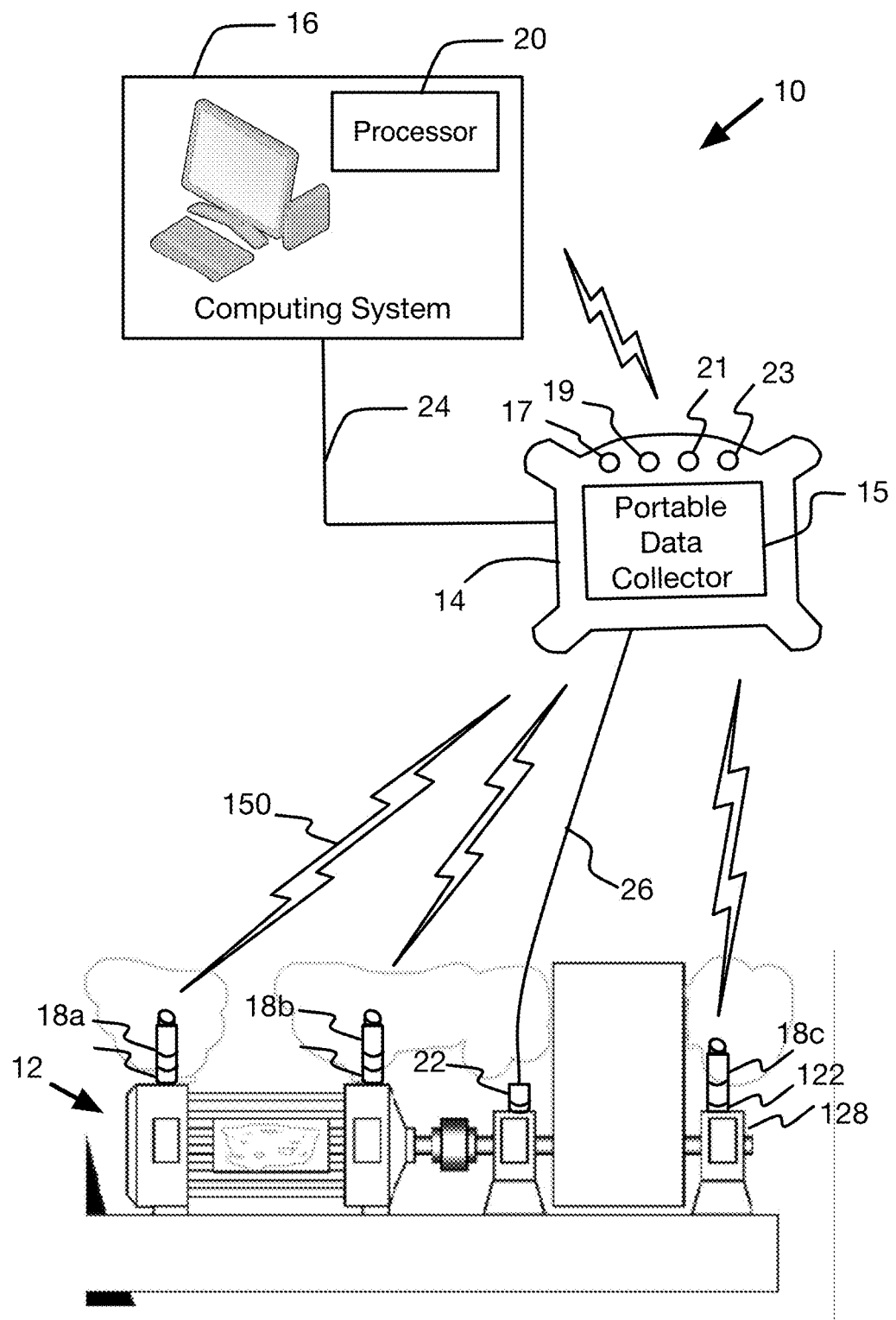
FIG. 1 is a diagram of a machine diagnostic data collection and analysis system according to an embodiment of this invention.

FIG. 1 shows a machine diagnostic data collection and analysis system 10 according to an embodiment of this invention. Diagnostic data as used herein means data obtained by inspection of a machine using a sensing device. The system 10 serves as a condition-monitoring tool useful in predictive maintenance of a machine 12, such as a motor, pump, generator, compressor, or lathe, having moving parts, such as a shaft, rotor, bearings, and gears. In some embodiments the system 10 is configured to provide real time feedback so as to perform predictive maintenance on, or otherwise adjust, parts of the machine 12.

In a preferred embodiment the machine diagnostic data collection and analysis system 10 includes a host computing system 16, a handheld, portable machine diagnostic data collection and analysis device 14, and one or more sensors 22 and sensor units 18. Machine diagnostic data is collected in real time by the data collection and analysis device 14. The data collection and analysis device 14 is configured to perform data collection via a wired sensor 22 that transmits an analog signal through a cable 26 to the data collection and analysis device 14, and also to perform wireless data collection via a wireless link with a sensor unit 18 (e.g., 18a, 18b, 18c) that wirelessly transmits raw sensor measurement readings to the data collection and analysis device 14 without the use of a cable. The data collection and analysis device 14 also collects diagnostic data via an embedded sensing device (e.g., camera CCD/sensor, pyrometer, stroboscope). The collected data is processed locally using automatic diagnosis processes to perform automatic diagnosis, and probability-based fault diagnosis processes to diagnose severity and confidence levels of faults. The collected data and diagnosis results are sent to the host computing system 16 for storage or for additional signal processing and analysis.

Host Computing System

In various embodiments the host computing system 16 is a general-purpose computer, such as a workstation, desktop computer, laptop computer, tablet computer, personal digital assistant device (PDA), or a smartphone-computing device. The computing system 16 is loaded with software, and optionally includes peripheral devices.

The computing system 16 includes a processor 20, a display device, one or more input devices (e.g., keys, buttons, keyboard, tablet keyboard, pointing device, stylus), volatile memory, non-volatile memory, and various input/output interfaces. The computing system 16 is configured with condition-monitoring software for analyzing collected machine data and with other software embodying complementary analysis tools and post processing tools accessible to a user to perform machine diagnostic analysis. For example, the computing system 16 is configured with software to perform vibration analysis, temperature analysis, shock pulse measuring, spectrum analysis of shock pulse results, fast Fourier transform of vibration data, fault detection, tachometry, and other machine diagnostic and predictive maintenance analysis on current and historical machine diagnostic data collected from one or more test points of one or more machines. The processor 20 executes software made up of computer programs, databases, and other data constructs that configure the operation of the computing system 16.

In a given embodiment the computing system 16 communicates with the handheld data collection and analysis device 14 to receive the machine diagnostic data, including vibration data. The computing system 16 communicates with data collection and analysis device 14 through a wireless connection (e.g., interface implementing Bluetooth standard; interface implementing a Wi-Fi standard), or through a wired interface 24 (e.g., via an Ethernet interface; via a USB interface; via a thunderbolt or firewire interface; via another standard or proprietary wired interface). Peripheral devices of the computing system 16 in various embodiments include printer(s), flash drive(s) other peripheral storage devices, and scanning devices. The host computing system 16 may be coupled to a communications network, such as an internet protocol-based network, another global access network, a local work group, a local area network, or a wide area network to share collected data and analysis. For example reports are transmitted, and analysis is distributed among multiple computing systems communicating over any such network. Data received from several different data collection and analysis devices 14 and other instruments are stored centrally on the host computing system 16 or at another computing platform. Such data includes the route raw sensor data collected from the machine 12, along with processing results derived by the data collection and analysis device 14.

Handheld Machine Diagnostic Data Collection and Analysis Device

Figure 2:
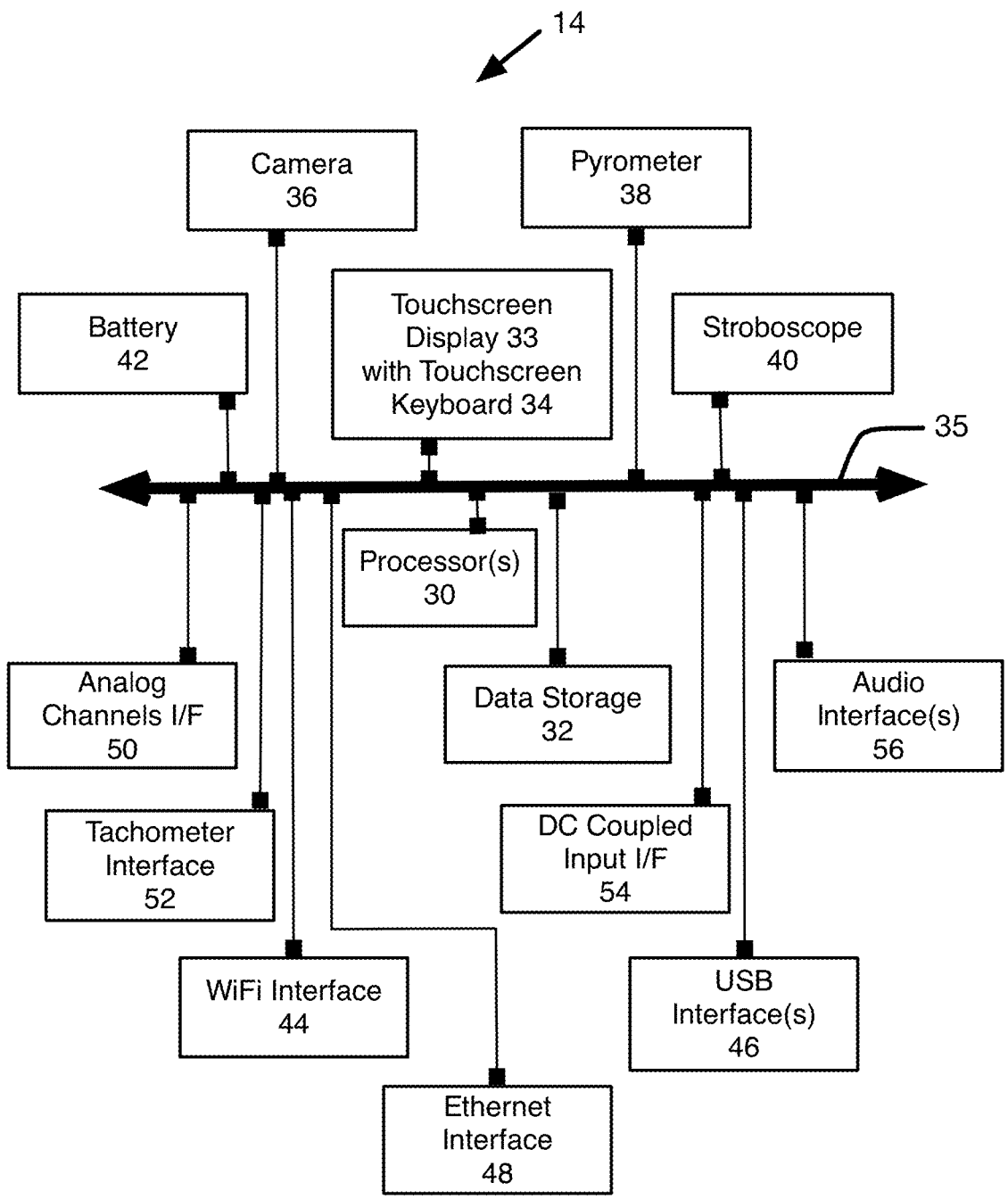
FIG. 2 is a block diagram of a handheld machine diagnostic data collection and analysis device according to an embodiment of this invention.

FIG. 2 shows a detailed block diagram of the handheld machine diagnostic data collection and analysis device 14 according to an embodiment of the present invention. The data collection and analysis device 14 is a portable unit held in hand by a technician or machine operator, and is used typically without being linked to the computing system 16. In some embodiments a link may be maintained with the computing system 16 during data collection and analysis. The data collection and analysis device 14 is a single body unit to which sensor units, sensors and other devices may be connected using the interfaces included therein. Primary functions of the device 14 are to collect machine diagnostic data, including vibration data and to perform local on-site, automatic diagnosis and fault diagnosis on the collected data.

As part of the data collection process, a maintenance technician may carry or otherwise move the data collection and analysis device 14, including cables, if any, and sensors 18, 22 from machine to machine, such as in accordance with a preprogrammed "route." The route is a scheduled sequence of test points among a plurality of machines, and includes measurement prescriptions for each individual test point of each individual machine. A machine test point is any location on the machine to which a sensor or sensor unit is mounted, and need not be specially adapted for data collection. In some instances, however, a mounting stud may be affixed to the machine and left in place on the machine at the test point location. The sensor unit 18 or sensor 22 is removably mounted to the machine in such instances by being removably mounted and dismounted from the mounting stud.

Route information includes a list of machines 12 from which data is to be collected, the identification of the test points for each machine, and the test point prescription (i.e., the setup instructions and parameters for each test point, data collection procedure instructions; automatic diagnosis that will be preformed automatically; and fault diagnosis) for each test point. The data is collected from each machine 12 and stored in the data collection and analysis device 14. Local diagnosis is performed automatically in some instances using data collected from for one or more test points of a machine. After data collection for the test point, machine, or route is complete, the stored data is downloaded to a database at a depository computing system (e.g., a server) or at the computing system 16 for historical storage and analysis.

The data collection and analysis device 14 is configured to provide a processing environment 149 (see FIG. 3) executed under an operating system 150 with a user interface 151, such as per a Linux™ operating system, Windows™ operating system, a Mac-OS™ operating system, an IOS™ operating system, an Android™ operating system, or another proprietary or open operating system software architecture. In an alternative embodiment, a proprietary, minimalist, executive program serves as an operating system for embedded computing applications. Accordingly referring again to FIG. 2, the data collection and analysis device 14 includes computing components, including one or more processors 30, data storage 32 (e.g., random access memory or other volatile memory; read only memory, read/write memory, a flash drive, a hard drive, an optical disk drive, or other non-volatile memory), a display and an input device, (e.g., a touchscreen 15) communicating via a bus architecture 35 or other system hardware architecture. The touchscreen 15 may be configured to provide a touchscreen display 33 and a touchscreen keyboard 34. Alternatively, a dedicated display and separate keyboard component may be included in place of the touchscreen 15. A battery 42 or an external power source provides power to the data collection and analysis device 14. During an exemplary data collection activity, a rechargeable battery preferably serves as the power source.

The data collection and analysis device 14 also includes several embedded devices within its housing so as to be part of the same integral body without the need of connecting to the data collection and analysis device via one of the interface ports. In some embodiments a camera 36, a pyrometer, 38, and a stroboscope 40 are embedded. Openings 17, 19, 21, 23 in the housing are present for the camera lens, the stroboscope light source and sensor, and the pyrometer laser sight. The embedded camera 36 includes a flash, optics, an optical sensor and a data interface. In some embodiments a bar code reader (or other quick response (QR) code reader) is implemented using the camera 36. In some embodiments an infrared imaging module is included with the camera allowing the technician to also capture infrared images using the camera interface.

In an example embodiment the embedded stroboscope 40 senses rotation speed of a machine part within a range of 30-15000 revolutions per minute (rpm) and a flash duration of 0.5 to 15°. The embedded pyrometer 38 includes a laser sight, along with a pyrometer data interface for moving collected pyrometry data into storage 32 or to a communication interface (e.g., interfaces 44, 46, 48). The pyrometer 38 performs contactless temperature measurement at a location on the machine 12 upon which the laser sight impinges. In an example embodiment temperature is sensed with a one second time response and 95% emissivity within a range of 0° C. to 200° C. to an accuracy of +/−3° C. for ambient temperature, and with a resolution of 0.5° C. in a field of view of 5° at 50% (e.g., 4 cm target at 50 cm distance).

The data collection and analysis device 14 includes several interfaces. Among audio interfaces 56 are a microphone input interface for connecting a microphone for use by a technician to tag a data collection activity with an audio note or for recording machine sound. An output audio speaker or audio headset jack also is included for outputting recorded audio. In an alternative embodiment, in addition or instead, a microphone and audio speaker are embedded in the data collection and analysis device 14.

Also included are a Wi-Fi interface 44, one or more USB interfaces 46, and one or more Ethernet interfaces 48. Data is collected from wireless sensor unit 18 through the Wi-Fi interface 44. The collection device 14 communicates with the computing system 16 using the Wi-Fi interface 44, a USB interface 46, or the Ethernet interface 48. A USB stick device also may interface to the data collection and analysis device 14 by one of the USB interfaces 46.

Several wired interfaces also are included for collecting machine 12 data from a wired sensor 22. In an example embodiment, there are multiple analog channels provided by an interface 50, a tachometer interface 52 for being coupled by wire to a tachometer, and a dc coupled input interface 54. In an example embodiment up to four programmable analog signal inputs (e.g., channels) may be coupled to the device 14 through the analog channels interface 50. Various sensors 22 may be wired to the channels of this interface 50, such as an accelerometer, vibration sensor, velocity sensor, absolute displacement sensor, relative displacement sensor, electrical current sensor, voltage sensor, or another machine diagnostic data sensor. For a sensor 22 coupled to the data collection and analysis device 14 by the wired interface, the processor 30 provides a signal processing capability to sample the sensor 22. DC coupled inputs (e.g., −24 to +24 volts DC) also may be provided to the interface 54 from sensors coupled to a channel of the interface 50. For example, FIG. 1 depicts a sensor 22 being connected to the data collection and analysis device 14's wired interface(s) by a wire connection 26 formed by one or more wires, cables, or fibers.

Software modules are loaded into and stored in the data collection and analysis device 14 for configuring the processor 30, the display 33, and the data collection and analysis device 14 to implement a user interface; to provide access to setup, control and operation of the embedded devices (e.g., camera, pyrometer, stroboscope; QR reader, infrared module); and to setup, configure, report, and execute data collection and analysis activities.

Figure 3:
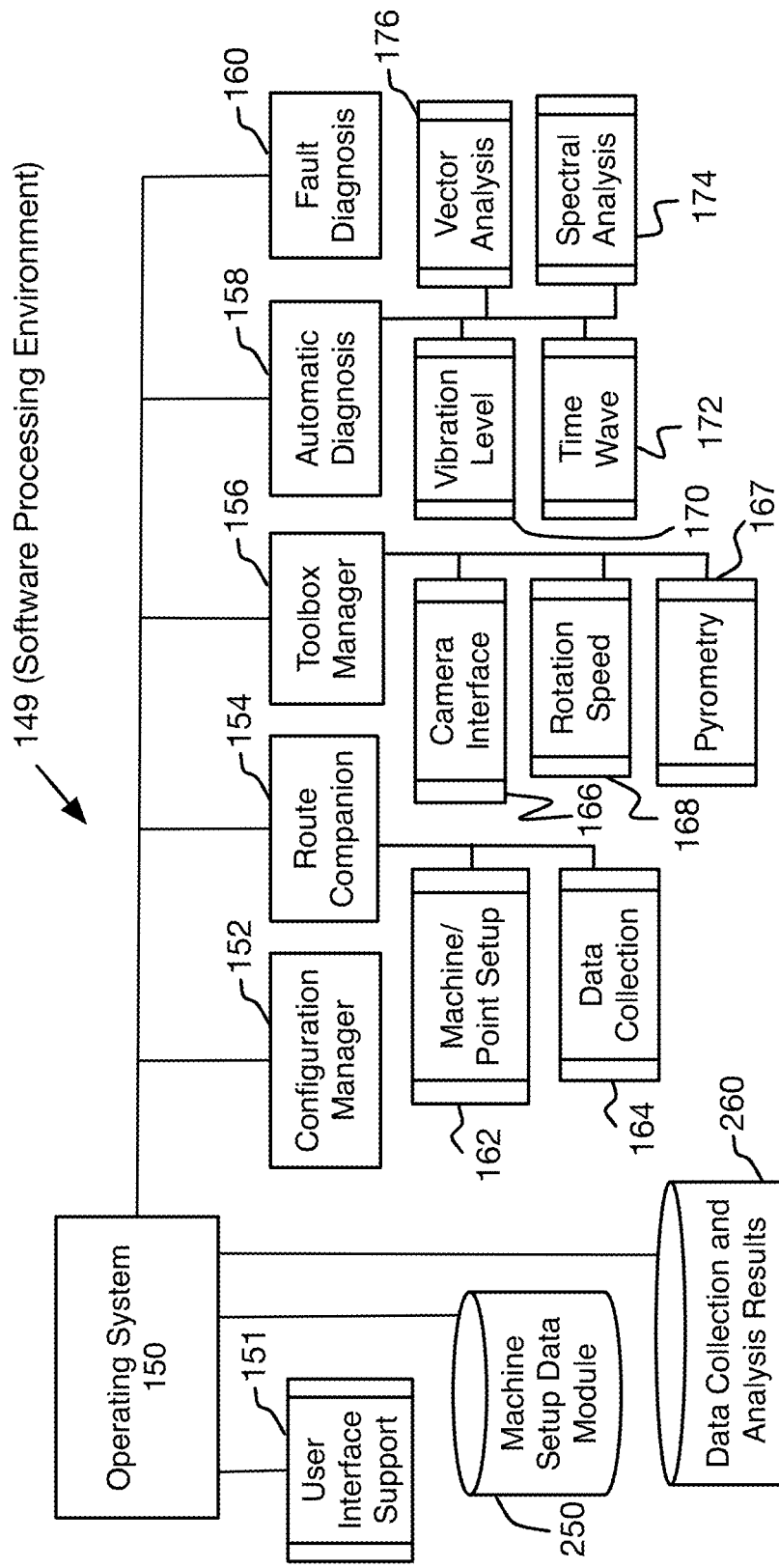
FIG. 3 is a diagram of the software process environment, which configures operation of the handheld machine diagnostic data collection and analysis device according to an embodiment of this invention.

FIG. 3 shows software process modules according to an exemplary embodiment, including a configuration manager module 152, a route companion module 154, a toolbox manager 156, one or more automatic diagnosis modules 158, and a fault diagnosis module 160. The configuration manager module 152 is for configuring data collection routes based on data stored in a machine setup data module 250. The route companion module 154 is for use by the technician while performing a route, and includes machine/test point setup processes 162, and data collection processes 164. The processor 30 and display 33, as configured by a machine setup process 162 and the machine setup data module 250, provide the technician with a sequence of measuring test points for the machine associated with the module, along with measurement prescriptions, setup instructions and parameters for each test point, and data collection procedure instructions. The processor 30 and display 33, as configured by a data collection process 164 and the machine setup data module 250 store collected data in the data collection and analysis results data module 260.

The toolbox manager module 156 includes sub-modules and processes for accessing and using the embedded devices, including one or more camera interface 166 sub-modules for operating the camera 36 and a rotation speed 168 sub-module for operating the stroboscope 40 to measure rotation speed using the laser sight. Also a pyrometer sub-module 167 provides pyrometer control for performing contactless temperature measurement by pyrometry using laser sighting. Other sub-modules also are included within the toolbox, such as for operating the camera as a QR code reader or for using an infrared hardware module of the camera. FIG. 1 shows openings 17, 19, 21, 23 at the front side of the housing of the data collection and analysis device 14 for the camera lens, laser sight, stroboscope, and pyrometer, respectively, for illustration purposes. In a preferred embodiment the openings 17, 19, 21, 23, instead are on the back side of the housing allowing the technician to view the touchscreen 15 while aiming the camera, laser sight, stroboscope and pyrometer at the machine 12.

The primary functions of the data collection and analysis device 14 are data collection and immediate, local on-site processing of collected data. For example, in some embodiments automatic diagnosis modules 158 are loaded on the data collection and analysis device 14 and include a vibration level analysis module 170, a time wave analysis module 172, a spectral analysis module 174, and a vector analysis module 176. Each module configures the processor 30, the display 33, and the data collection and analysis device 14 to process the collected data. Accordingly, automatic diagnosis is performed on the spot at the time of data collection. The processor 30 and display 33, as configured by automatic diagnosis modules 158 and the machine setup data module 250, store analysis results in the data collection and analysis results data module 260. The automatic diagnosis modules 158 configure the data collection and analysis device 14 to perform vibration analysis, temperature analysis, shock pulse measuring, spectrum analysis of shock pulse results, fast Fourier transform of vibration data, fault detection, tachometry, and other machine diagnostic and predictive maintenance analysis for one or more test points of one or more machines.

The vibration analysis module(s) 170 perform high pass and low pass filtering, vibration velocity, rolling element detection shock pulse detection, and an alarm detection. The time wave analysis module 172 performs demodulation of time waveforms, sampling frequency selection, integration for determining, velocity, acceleration and displacement. The spectral analysis module 174 includes use of envelopes, zoom factors, different frequent ranges of analysis, weighting and synchronous analysis. The vector analysis module 176 performs vector measurements for different frequency ranges and includes synchronous averaging. Results of the modules 170-176 include indicators used during fault diagnosis to detect a fault.

The fault diagnosis module 160 configures the data collection and analysis device 14 to process diagnostic data collected from one or more test points of a machine to automatically detect (on site) common types of faults, including mass unbalance, misalignment, a mounting defect, moving part looseness, structural resonance, a lubrication defect, rolling element bearings defects (e.g., pitting, general wear), gear defects (e.g., tooth wear, broken tooth, backlash), and cavitation. In alternate embodiments additional faults are diagnosed by automatic fault diagnostic processes described herein. Such fault diagnosis is described in more detail below in connection with the description relating to FIGS. 11 and 12. The processor 30 and display 33, as configured by fault diagnosis module 160 and the machine setup data module 250, store analysis results in the data collection and analysis results data module 260. Because automatic diagnosis and fault diagnosis may be performed during data collection or upon receipt of collected data, results of diagnosis are available on the device 14 for each machine 12 right after the applicable data collection is performed.

Once the technician completes a route, the technician transfers all the data collected and the results of the automatic diagnosis module 158 and fault diagnosis module 160 performed by the data collection and analysis device 14 to the host computing system 16 for storage, archiving, or other processing.

Machine Diagnostic Data Sensor Unit

Figure 4:
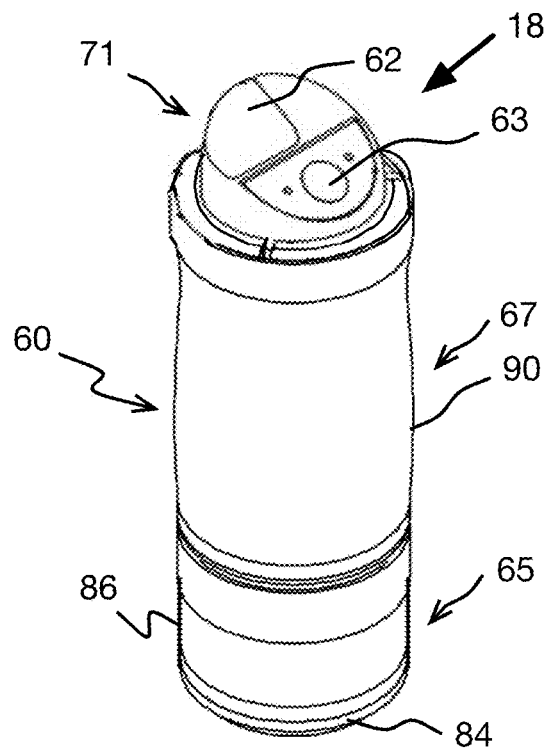
FIG. 4 is a perspective view of a machine diagnostic data sensor unit according to an embodiment of this invention.
Figure 5:
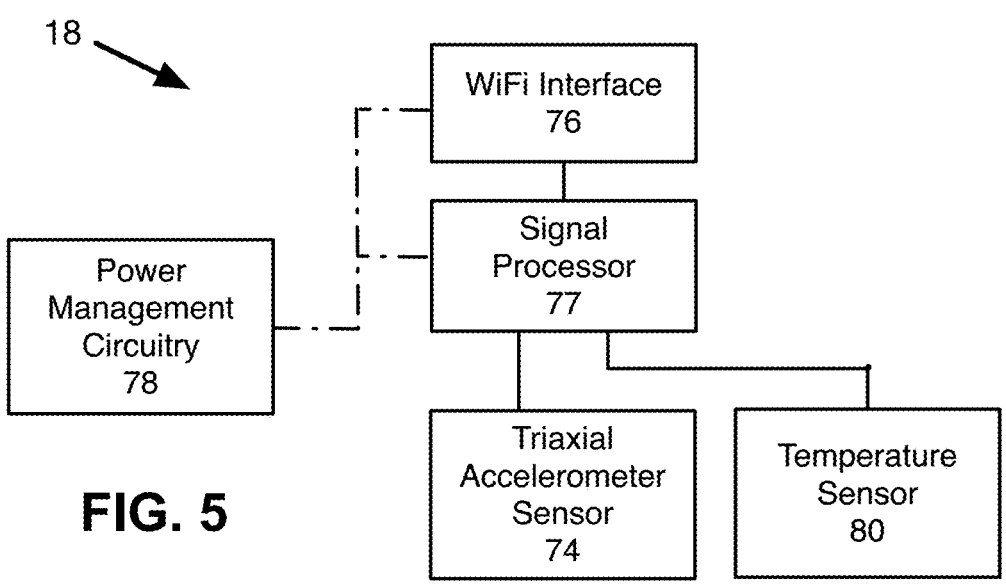
FIG. 5 is a block diagram of a machine, diagnostic data sensor unit electronics according to an embodiment of this invention.

FIGS. 4-5 show a wireless sensor unit 18, according to an embodiment of the invention, which communicates wirelessly with the data collection and analysis device 14. The sensor unit 18 includes a housing 60, an antenna 62, an on/off switch 63, a sensor, a battery, and a circuit board with one or more circuit components mounted thereon. The sensor is located at the base of the sensor unit 18 so as to be as close as possible to the machine surface from which machine vibrations propagate into the sensor unit 18. In an example embodiment the battery is a rechargeable lithium ion battery, which may be recharged through a USB interface 75. The battery preferably has a capacity for a full days activity of data collection activity.

Machine diagnostic data is sensed from machine 12 by the sensor. In an example embodiment the sensor is an accelerometer, or a tri-axial accelerometer 74 having a sensing component for each of three axes (x, y, z). In some embodiments the sensor unit 18 includes an additional sensor, such as a temperature sensor 80. The sensors 74, 80 have an electrical connection to the circuit board so as to be in electrical communication with a signal processor 77. Sensor data is sampled from the sensors 74, 80 by the signal processor 77. The signal processor 77, along with data storage circuits, power management circuitry 78, a Wi-Fi interface 76 component, and other circuits are mounted or connected to the circuit board. The signal processor 77 controls and manages collection, buffering, storage, and transmission of sensor data. The Wi-Fi antenna 62 is coupled to the Wi-Fi interface 76 at a connector, and radiates a Wi-Fi signal to the data collection and analysis device 14 as per signals and signal contents determined by the signal processor 77 and/or Wi-Fi interface 76.

In an example embodiment the wireless tri-axial accelerometer sensor 74 provides 3-axis synchronous acquisition with a 20 kHz bandwidth on each axis (i.e., x, y, and z axes) within a 3 db frequency range (e.g., 15 kHz (z-axis) 6 kHz (x-axis and y-axis) and an 80 dB signal to noise ratio; and exhibits an accuracy of +/−3%. In a specific embodiment full-scale accelerometer detection is rated at 80 g. The bandwidth, signal to noise ratio, accuracy and other performance specifications may vary in other embodiments.

Periodic machine diagnostic data collection of vibration data and other diagnostic data using the portable handheld data collection and analysis device 14 in the context of predictive maintenance implies a full day of measurement activity among several machines in a factory. Accordingly, the battery preferably is rechargeable and preferably has a lifetime between charges of approximately 8 hours or greater (1 day of measurement activity).

In contrast to a sensor that (i) is permanently affixed to a single test point location of a single machine, (ii) is dedicated to collecting data from that single test point location, and (iii) has its sensor output sampled by a separate device electrically coupled by a cable or other wired connection—the sensor unit 18 instead is configured to be removably mounted to various test point locations at various machines of the same or different machine type, and to provide a wireless communication capability. Of significance is that the entire sensor unit 18 is removably mounted to the machine 12 at a given test point location.

In an example embodiment the sensor unit 18 is formed in three compartments: a base portion 65, a middle portion 67 and a cap portion 71. The base portion houses the sensors 74, 80. The middle portion houses the circuit board, electrical components, and battery. The cap portion includes the Wi-Fi antenna 62 and the on-off switch 63. A limited degree of decoupling is provided between the base portion and middle portion 67 internal components (e.g., circuit board, battery, Wi-Fi interface 68, signal processor 77), and also may be provided between the middle portion 67 internal components and the cap portion 71. In an example embodiment the circuit board and circuit components (e.g., signal processor 77, Wi-Fi interface 76), along with the battery are isolated in part from the vibrations propagating to the sensor 74. A damping pad covers a surface of the battery to dampen vibrations propagating to the battery. Additional damping bodies are provided at each of a first longitudinal end and second longitudinal end of the circuit board and battery. Such damping bodies reduce the adverse contributions of the sensor unit's internal structures to the overall frequency response of the sensor unit. Preferably, the sensor unit 18 has a frequency response as good as that of a comparable wired sensor 22 of the same type, (e.g., a wired accelerometer or tri-accelerometer sensor).

The base portion 65: The sensor 74 is located within a base component 84 of the sensor unit 18. The base component 84 is surrounded, concentrically, by a hollow, cylindrical housing 86. In an example embodiment the housing 86 and base component 84 each are made of stainless steel, although another rigid, durable material suitable for industrial application may be used in other embodiments. A bottom surface of the base component 84 is the bottom of the sensor unit 18. The base component 84 includes openings into which respective sensor components may reside. The size of each opening is prescribed according to the sensor dimensions so as to provide a tight fit for the sensing components and sensor 80.

Cap portion 71: The antenna 62 and the on-off switch 63 are located in a cap member 88. In alternative embodiments the on-off switch 63 and/or antenna 62 may be located at another portion of the sensor unit 18. The cap member 88 fits into an opening at a top end of the middle portion 67 of the sensor unit 18. An elastomeric O-ring serves as a damping body providing damping of vibrations propagating from each one of the cap portion 71 and middle portion 67 to the other of the cap portion 71 and middle portion 67. In particular, the O-ring provides damping between the cap member 88 and the housing 90 at the joint (i.e., at the abutting parts of the cap member 88 and housing 90.

Middle portion 67: The middle portion 67 includes a hollow cylindrical housing 90 which concentrically surrounds the battery and the circuit board, including the signal processor 77, and one or more components of the Wi-Fi interface 76 (i.e., component(s) other than all or a portion of the antenna 62). In an example embodiment the housing 90 is made of stainless steel, although another rigid, durable material suitable for industrial application may be used in other embodiments.

In an exemplary embodiment each of the sensor 22 and the sensor unit 18 include a female-threaded opening) within the base component 84 for receiving a threaded male stud of a mounting accessory. In other embodiments the male and female positions may be reversed. In still other embodiments different structures may be provided for securing a mounting accessory to the sensor unit 18. In still other embodiments, the mounting structure may instead be formed as an integral part of the base component 84 or of the sensor unit 18.

In one embodiment a simple stud accessory serves as the mounting accessory. The stud accessory includes a threaded male stud extending from a base plate. The stud accessory may be permanently mounted at a machine 12 such as to a mounting plate or directly to a housing of the machine. The sensor 22 or sensor unit 18 is screwed onto the threaded male stud at the machine to mount the sensor unit at the test point location defined by the location of the stud accessory on the machine. The sensor or sensor unit is dismounted by unscrewing the sensor 22 or sensor unit 18.

In another embodiment a magnetic stud accessory serves as the mounting accessory. The magnetic stud accessory includes a threaded male stud extending from a body. In various embodiments the body is a magnet or has one or magnets at its base. A flat magnet is effective for mounting the sensor unit 18 to a flat surface, such as a mounting plate of a machine 12. A bipolar magnet, such as a pair of magnets at a base of the body is effective for mounting the sensor unit 18 to a curved surface of a machine 12.

In some embodiments an indexed magnetic stud accessory serves as the mounting accessory. The indexed magnetic stud accessory includes a threaded male stud extending from a body, and one or more magnets. The male stud screws into the female threaded opening. The body also includes an indexing positioning mechanism, such as one or more notches at its base. Such indexing provides a control technique for assuring repeatable orientation of the sensor 74 axes relative to the machine 12.

Data Collection and Analysis—Overview

One or more sensors 22 and sensor units 18 are used with the data collection and analysis device 14, according to an embodiment of the invention, to perform operational methods for implementing data collection, automatic local data diagnosis, and automatic local fault diagnosis on the collected data. In some embodiments the data collection and analysis device 14 includes multiple processors 30 configured to perform parallel processing, so as to perform data collection and automatic local data diagnosis processing together in real time. As a benefit, the data collection and analysis device 14 provides immediate automatic display of collection/measurement progress at a current test point location and of local processing results.

The data collection and analysis device 14 is configured in various test point collection applications to manage data collection and local data diagnosis of data received from the wireless sensor unit 18, from a wired sensor 22 (e.g., a wired tri-axial accelerometer), or from 4 synchronous channels (via channels 50) from 4 single-axis wired accelerometers. For example, at one test point location of a given machine 12, data may be collected using the sensor unit 18. As part of the same route where data also is collected from another test point location on the same machine, data collection is performed in an exemplary embodiment using the wired sensor 22. Such wired sensor 22 may be a tri-axial accelerometer. At still another test point location for the same machine during the same route, data is collected by the data collection and analysis device 14, simultaneously from 4 synchronous channels (via channels 50) coupled respectively to 4 single-axis, wired accelerometers. At other test points, others types of machine diagnostic sensors may be used for measuring and collecting machine diagnostic data (via any of the interfaces 44-56). Accordingly, during performance of any given route, the data collection system may be configured to collect data using the data collection and analysis device 14 together with any one or more sensor units 18, wired sensors 22, and other sensors coupled to the data collection and analysis device 14 through any of the device 14 interfaces 44-56. Data collection from multiple sensor units 18 mounted at respective test point locations on a given machine 12 is performed in series or in parallel, according to the embodiment. Similarly, data collection from a combination of one or more wired sensors 22 and one or more sensor units 18 is performed in series or in parallel, according to the embodiment.

A user interface of the data collection and analysis device 14 is implemented in software for controlling the display 33 and responding to user inputs to enable data collection and overall operation of the data collection and analysis device 14. A technician can access a toolbox interface (e.g., toolbox manager module 156) to access and operate the embedded camera 36, bar code scanner, infrared module, pyrometer 38, and stroboscope 40.

The technician can access the configuration manager module 152 to access, edit, and add to a database for configuring a machine diagnostic data collection route. The configuration manager module 152 is used to configure the data collection and analysis device 14 to create or modify a route. Alternatively, a route can be configured by the computing system 16 and downloaded to the data collection and analysis device 14. Such route configuration includes the machine setup data module 250 for each machine on the route.

Configuring for Machine/Test Point Collection and Analysis

The machine setup data module 250 for a given machine 12 is created prior to performance of a route, and is used each time a route is performed that includes the machine 12 corresponding to the specific module 250. The machine setup data module 250 is created using the data collection and analysis device 14, the computing system 16, or another computing platform. Contents of the data module 250 are used by the machine/test point setup process 162, the data collection process 164, the automatic diagnosis modules 158, and the fault diagnosis module 160. The contents include identity data for the machine, (e.g., bar code, serial number, model, machine type, photograph, graphic image), a test point prescription for each test point of the machine, identification of automatic diagnosis and fault diagnosis to be performed, parameters used for automatic diagnosis, and parameters used for fault diagnosis. The test point prescription includes test point data setup instructions, test point parameters, test point measurement/collection instructions; and automatic diagnosis triggers for triggering execution of select automatic diagnosis and fault diagnosis processes during or immediately after collection of data from the corresponding test point.

In some embodiments, the machine setup data module 250 is generated by automatic setup software that allows the setup activity to be performed by any user regardless the user's level of knowledge of vibration analysis and signal processing. The user enters the machine identifying information. A machine configuration is created by the user for the identified machine 12 using a graphic assembling program. Such program allows the user to enter a simple topology of the machine 12. For example, the user selects the different components of the machine of significance to machine diagnostic data collection and analysis, (e.g., shaft, bearings, gearbox, pump). The user also selects the type of coupling between each component. In addition to the components and the couplings, the user enters the rotation speed and power output for the machine. Although other types of information may be input in some embodiments, the basic information indicated above is sufficient to create the machine setup data module 250 for a given machine, so as to perform automatic fault diagnosis for common faults according to an embodiment of the present invention.

In an example embodiment the faults screened for are mass unbalance; misalignment; mounting defect; looseness; structural resonance; lubrication defect; rolling element bearings defects (Pitting, general wear); gear defects (tooth wear, broken tooth, backlash); and cavitation. These are common faults that can be detected based on algorithms. The automatic process of fault diagnosis based on common faults has resulted in good reliability for the diagnoses and recommendations automatically generated. The addition of other, less common faults in some instances may lower the reliability of the confidence level analysis of the automatic fault diagnosis module 160. Accordingly, configuring the automatic process of fault diagnosis for common faults is preferable.

The automatic setup software generates a number, name, location, and direction of measurement for each test point location on the machine from which data is to be collected. Such locations are determined based on either of two options: (i) for tri-axial measurements, 3 test points are generated—one for measuring each of an X- Y- and Z-axis component of the measurement; or (ii) for a minimal measurement, a test point is identified for each one of either a single axis or two axes in radial and axial directions only.

In an example embodiment the following machine setup data is configured automatically by the automatic setup software based on the machine topology and other configuration data entered by the user, and stored in the module 250: an automatic definition of the raw sensor data to be measured; an automatic definition of the indicators to be monitored; an automatic definition of fault defect assumptions, characteristic symptoms, and symptom weights; and an automatic association of alarm thresholds on standard indicators as defined by the ISO standard with symptoms.

In an alternative embodiment, a more experienced user generates the machine setup data module 250 for a given machine using templates to specify the machine configuration (e.g., components, couplings, rotation speeds, and power output); the test point locations, the raw data signals to measure, the defect assumptions, characteristic symptoms, the indicators to be monitored, and the alarm thresholds (or other discerning criteria) of each indicator.

The machine setup data module 250 in some embodiments also includes a picture of the machine showing locations of the test points graphically on the machine. For example, a photograph of the machine is uploaded by the user or captured using the embedded camera of the data collection and analysis device 14. The test point locations or the entire picture is generated automatically based on the kinematics description realized by the automatic setup software in some embodiments. For example, multiple test point locations may be defined in connection with a rotating shaft so as to collect axial, radial, and oblique data measurements.

Naive Bayesian Network

The automatic setup software generates a Bayesian network for the machine. Bayesian refers to a degree-of-belief interpretation of probability, as opposed to frequency or proportion or propensity interpretations. Bayesian probability is a quantity assigned for the purpose of representing a state of knowledge, or a state of belief. A Bayesian network is a probabilistic graphical model (a type of statistical model) that represents a set of random variables and their conditional dependencies via a directed acyclic graph. As implemented, the Bayesian network represents the probabilistic relationships between faults (identified by the defect assumptions) and their characteristic symptoms.

In a preferred embodiment, a naive Bayesian network is generated to implement the severity diagnosis of the fault diagnosis module 160. A naive Bayesian network is a simple case of a Bayesian network in which each root node (i.e., each fault node) is independent of the other root nodes (i.e., other fault nodes). This means that the computed Bayesian probability for severity of a given fault is based only on the characteristic symptoms for such fault, and not on the diagnosis of any other fault. Each fault node includes a set of attribute nodes, (i.e., one attribute node per characteristic symptom). Basing the severity probability on the naive Bayesian structure corresponds to assuming that the characteristic symptoms are independent given the presence (or absence) of the fault.

Each of the common faults screened by the automatic fault diagnosis module 160 is defined by a set of characteristic symptoms. These symptoms need not include every possible symptom that would appear when the fault is present, but includes a set of those symptoms that effectively characterize the fault. Each symptom is based on one or more indicators derived from machine diagnostic data. A technician experienced in vibration analysis knows what sensor data and vibration analysis measures are important for diagnosing a fault. Such data and measures are used to define the characteristic symptoms, In an example embodiment, the processor 30 is configured to compute the Bayesian probability $P_i \varepsilon [0,1]$ (i=1,N) for severity of a given fault $F_i$ among N faults, in which fault $F_i$ is defined by the set of 'm' characteristic symptoms $S^i = \{S^i_1, \ldots, S^i_m\}$, given the information about the presence of each symptom, by implementing the following equation (1):

$$P_i = P(F_i \text{ is present} | S^i_1, \ldots, S^i_m) =$$
$$= (1/Z) * P(F_i \text{ is present}) * P(S^i_1 | F_i \text{ is present}) * \ldots *$$
$$P(S^i_m) | F_i \text{ is present})$$

where $Z = P(F_i \text{ is present}) * P(S^i_1 | F_i \text{ is present}) * \ldots * P(S^i_m | F_i \text{ is present}) + P(F_i \text{ is } not \text{ present}) * P(S^i_1 | F_i \text{ is } not \text{ present}) * \ldots * P(S^i_m | F_i \text{ is } not \text{ present})$ and where
$P(S^i_j | F_i \text{ is present}) = P(S^i_j) * K^i_j | F_i \text{ is present}$
$P(S^i_j | F_i \text{ is not present}) = P(S^i_j) * K^i_j | F_i \text{ is not present}$ The values for the probability that fault $F_i$ is present (i.e., $P(F_i \text{ is present})$) and the probability that fault $F_i$ is not present (i.e., $P(F_i \text{ is not present})$) are prescribed values for the machine which do not change from machine specimen to machine specimen of the same machine model. The values are prescribed to be a value between 0 and 1 by any experienced machine diagnostic technician based on a history of the machine model and do not change. As implemented, they are constants used by the automatic setup software when configuring the machine setup data module 250 for the machine.

The probability value that each given characteristic symptom $S_j$ for fault Fi given that fault $F_i$ is present (i.e., $P(S^i_j | F_i$ is present)), and the probability value that each given characteristic symptom $S_j$ for fault Fi given that fault $F_i$ is not present (i.e., $P(S^i_j | F_i$ is not present)) are computed during the fault diagnosis module 160 execution. As noted by the equation, each such probability value has two components: a probability that the symptom $S_j$ for fault i is present (i.e., $P(S^i_j)$); and a weight $K^i_j$ for such symptom j for such fault i (e.g., $K^i_j | F_i$ is present; $K^i_j | F_i$ is not present). The probability that the symptom $S_j$ for fault i is present (i.e., $P(S^i_j)$) is computed during the fault diagnosis module 160 execution. The weights are prescribed parameters and are not based on the acquired machine diagnostic data. The weights are set and stored in the machine setup data module 250 by the automatic setup software. The weights are read from the machine setup data module 250 during the fault diagnosis module 160 execution. Note that there is one weight $K^i_j$ for each such symptom j for such fault i given that fault i is present, and a different weight $K^i_j$ for such symptom j for such fault i given that such fault is not present. These weights are parameters.

A description of the assignment of the weight parameter values is discussed here. Any given characteristic symptom for a given fault is prescribed as being a primary symptom of the fault or a secondary symptom of the fault. One common weight value is prescribed for each primary symptom of a given fault and another common weight value is prescribed for each secondary symptom of a given fault. Such common values may vary from one fault type to another fault type, (e.g., the common value for primary symptoms of a mass unbalance fault differ from the common value for a primary symptom of a bearing defect fault; the same logic applies for secondary symptoms). Accordingly, for a given fault, the weight value of each primary symptom $S_j$ for fault Fi given that fault $F_i$ is present is the same. Also, the weight value of each primary symptom $S_j$ for fault Fi given that fault $F_i$ is not present is the same. However, the weight value of a primary symptom $S_j$ for fault Fi given that fault $F_i$ is present need not be the same as the weight value of such primary symptom $S_j$ for fault Fi given that fault $F_i$ is not present. Further, the weight value of a primary symptom $S_j$ for fault Fi given that fault $F_1$ is present need not be the same as the weight value of such same primary symptom $S_j$ for fault $F_2$ given that fault $F_2$ is present. Similarly, the weight value of a primary symptom $S_j$ for fault Fi given that fault $F_1$ is not present need not be the same as the weight value of such same primary symptom $S_j$ for fault $F_2$ given that fault $F_2$ is not present.

In an example embodiment the automatic setup software includes a table of weight values. There are two entries for each one fault of the set of common faults for which the fault diagnosis module 160 is configured, (i.e., a primary symptom weight and a secondary symptom weight). Such values are prescribed. Thus, for a configuration of 10 common faults there are 20 entries in the table.

A symptom is prescribed to be a primary symptom or a secondary symptom for a given fault based on the symptom's known importance or significance in contributing to the diagnosis of such fault. Such knowledge is known to an experienced machine diagnostic technician or experienced machine vibration analysis technician. The specific number stored in the table for a primary weight of a given symptom versus a secondary weight for a given symptom is configurable as a setup parameter with the embodiment of the automatic setup software (i.e., as compiled) Thus, the two values for a given fault type can be changed (by the manufacturer of the fault diagnosis module) to adjust the effectiveness of the fault diagnosis module 160. Accordingly, effective values preferably are determined empirically for each of the common fault types.

A description of the derivation of the probability that a symptom $S_j$ for a fault i is present (i.e., $P(S^i_j)$) is discussed here. The symptom probability $P(S^i_j)$ is not a parameter of the naive Bayesian network. It is a computed value, which along with the symptom probabilities for the other characteristic symptoms of a given fault serve as an inputs to the network to obtain a probability $P_i$ for a fault $F_i$.

Figure 6:
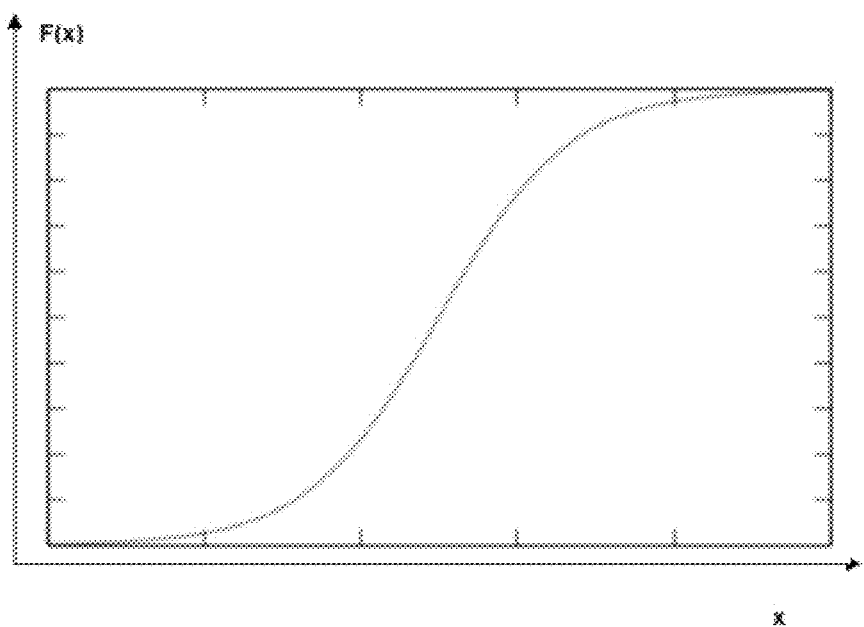
FIG. 6 is a graph of a sigmoid curve function for determining probability of symptom presence based on a resolved indicator(s) X, according to an embodiment of this invention.

The diagnosis of a symptom is a determination of a probability that the symptom is present in the machine. The probability determination is modeled by a sigmoid function F(x), where X is an indicator function. FIG. 6 shows the sigmoid curve model used in a preferred embodiment to determine the probability $P(S^i_j)$. X is obtained by resolving a set of one or more indicators that define the given symptom. Consider a simple scalar indicator, H0=amplitude of the first harmonic of the rotation speed. For an example symptom, the symptom is that indicator H0 is high. In conventional fault diagnosis, a simple threshold is compared to the first harmonic of the rotation speed to determine in binary terms whether the symptom is present or not. However, a value just below the threshold may be significant and dismissed using such an approach. According to an embodiment the present invention, such near-miss information is factored into the diagnosis. According to the preferred embodiment, a sigmoid function is applied, so that instead of a binary 1 or 0 as the symptom diagnosis outcome there is a probability value as the diagnosis outcome. For example, $F(X)=1/(1+\exp(-\lambda(X-\mu)))$ is the equation for the sigmoid function according to the preferred embodiment. X is the resolved value of the indicator, (i.e., the computed first harmonic of the rotation speed). $\lambda$ and $\mu$ are parameters used to fit the data to the sigmoid function for this symptom. In effect the parameters define a pair of thresholds for defining a first probability value and second probability value outcome of F(X). The shape of the sigmoid curve is the same for each symptom. The values of $\lambda$ and $\mu$ differ and serve to scale the curve to the specific symptom.

For a symptom defined by a function of multiple indicators, the indicators typically are related. For example, a symptom may relate to a spectrum acceleration as compared to preponderant indicators calculated from the same spectrum, (e.g., a symptom H0 is preponderant is an indication of whether H0 is preponderant over H1 and H2. The function F(X) for such a preponderant indicator is expressed as $F(X)=F(H0=1\times H0, H1=2\times H0, H2=3\times H0,)=(1\times H0)/(1\times H0+ 2\times H0+3\times H0)$, where X is plugged into the sigmoid function of FIG. 6 to obtain the probability $P(S^i_j)$).

The relating of an indicator to a symptom along with the test criteria for diagnosing the symptom is based on the knowledge used in vibration analysis and other machine diagnostic data analysis. For example, a vibration technician knows that the value of the high frequency acceleration energy band is an indicator for a bearing fault, and knows that there is a threshold to apply to such indicator. Rather than defining the scalar threshold value, the parameters of $\lambda$ and $\mu$ are defined as informed by such threshold value to arrive at symptom diagnosis according to embodiments of the present invention. Similarly a vibration technician knows that H0 preponderant is an indicator for a mass unbalance fault. Rather than defining a simple threshold value for preponderance, the parameters of $\lambda$ and $\mu$ are defined as informed by such simple threshold value to arrive at symptom diagnosis for H0 preponderant according to embodiments of the present invention. Other symptoms based on a single indicator or a set of indicators are defined using the same methodology.

Thus the definition for each symptom includes an indicator(s) and a pair of parameters $\lambda$ and $\mu$ to test the indicator and determine a probability value $P(S^i_j)$ for presence of the symptom. An indicator is a measurement collected with a sensor or the results of automatic diagnosis processing of the raw data collected by a sensor from a test point. An indicator is defined by the measurement or analysis result, the test point for the measurement, and the direction of measurement (e.g., radial, axial, oblique, x-, y-, z-axis). For a given fault, the set of characteristic symptoms may encompass indicators corresponding to data or analysis results of data measured from a common test point location or from varying test point locations. For example, for a given fault one symptom's indicator may relate to a radial measurement taken from one test point location, while another symptom's indicator may relate to an axial measurement taken from a different test point location. As another example, for another given fault one symptom's indicator may relate to an x-axis measurement taken from one test point location, while another symptom's indicator may relate to a y-axis measurement taken from the same test point location using a tri-axial accelerometer. For a fault that has symptoms with indicators requiring measurements from multiple test point locations, the fault diagnosis for such fault is performed automatically after the raw data is collected from all of the specific multiple test point locations contributing data to the fault symptoms' indicators.

Method of Data Collection

Figure 7:
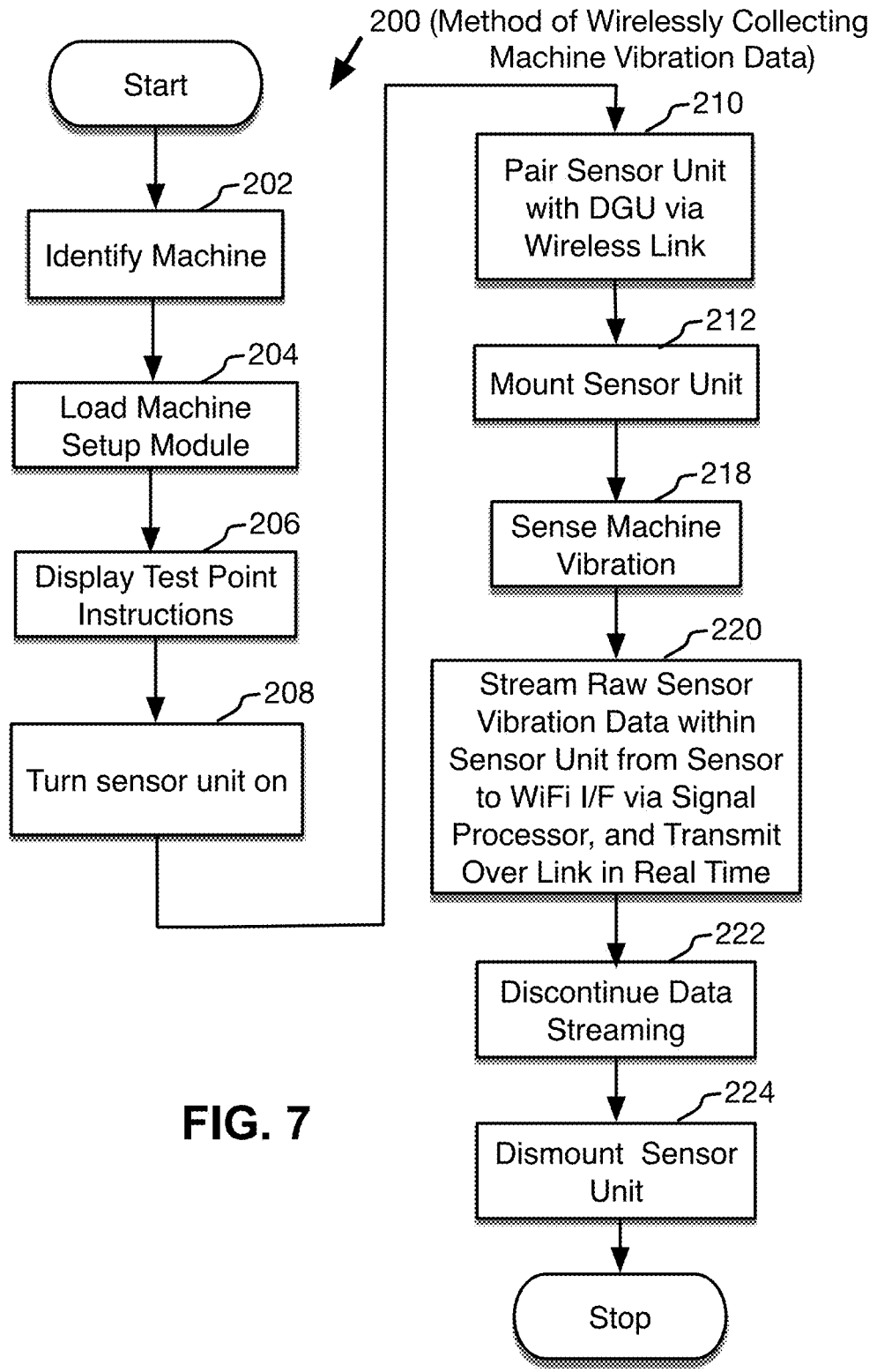
FIG. 7 is a flow chart of a method for wirelessly collecting machine diagnostic data using the sensor unit and handheld machine diagnostic data collection and analysis device.

Operation of the data collection and analysis device 14 with the sensor unit 18 during performance of a route is now described. FIG. 7 is a flow chart of a method 200 of collecting sensor data wirelessly. With the data collection and analysis device 14 turned on, a technician accesses the route companion module 154 via the user interface 151 to select a route to perform. The route is loaded for access by the processor 30. The route includes a list of machines and for each machine includes a list of test point locations, and for each test point location, includes a test point prescription—test point data setup instructions, test point parameters, test point measurement/collection instructions; and automatic diagnosis triggers for triggering execution of select automatic diagnosis and fault diagnosis processes during or immediately after collection of data from the corresponding test point.

At step 202 the technician identifies the current machine 12 of the route. In some embodiments, the technician will approach the machine 12 in the facility with the data collection and analysis device 14 in hand and use the QR code reader module of the camera interface to scan the QR code of the machine 12. The processor 30 then processes the QR code to identify a corresponding machine for which a machine/point setup module and data collection module are to be executed. In other embodiments, an alternative method of identifying the machine is implemented. For example, the technician may enter in the machine serial number. In another embodiment, the data collection and analysis device 14 displays a photograph of each machine (or remaining machine) on the route and the technician selects the photograph corresponding to the machine in his presence. Or, the data collection and analysis device 14 shows a photograph of the next machine for which data collection and analysis is to be processed, and the technician acknowledges such machine identification when he encounters it on the route.

Once the machine 12 is identified, at step 204 the machine/point setup process is executed by the processor 30 to configure the data collection and analysis device to perform data collection and local on-site automatic diagnosis and fault diagnosis for the identified machine 12. FIG. 7 shows a data and control flow diagram of the machine/point setup module 152 for preparing to collect data at a machine test point. The machine/point setup module 152 accesses the machine setup data module 250 to form a table 252 or other data construct of the test point data collection instruction related data. The machine/point setup module 152 also configures the automatic diagnosis parameters 286 (see FIG. 10) for the automatic diagnosis module 158 to be performed in connection with the current test point; and also configures the fault diagnosis parameters 287 and machine configuration 291 (see FIG. 11) for the fault diagnosis module 160 to be performed in connection with the current test point.

At step 206 instructions 254 are displayed on display 33 for a current test point of the current machine on the route. At step 208 each sensor unit 18 and sensor 22 to be removably mounted on the machine 12 is turned on. At step 210, a sensor unit 18 and the data collection and analysis device 14 establish a wireless Wi-Fi communication link. When the data collection and analysis device 14 is powered on and is within communication range of a sensor unit 18 that also is powered on, the Wi-Fi interface 44 scans the communication field for a linking signal from the sensor unit 18 according to a Wi-Fi communication protocol. At the sensor unit 18, when it is turned on at on-off switch 63, the signal processor 77 instructs the Wi-Fi interface 76 to commence the wireless protocol for linking the sensor unit 18 to the data collection and analysis device 14. In an example embodiment data communications between the sensor unit 18 and data collection and analysis device 14 have a range extending to 10-20 meters depending on the noise in the environment affecting wireless communication. The specific linking time and distance range may vary in differing embodiments. Preferably, the data collection and analysis device 14 automatically detects the presence of the sensor unit 18 within 30 seconds resulting in linking of the sensor 18 and the data collection and analysis device 14. In some embodiments, the linking protocol is for pairing the data collection and analysis device 14 with one sensor unit 18 at a given time. During communications, disturbances or other interruptions to a data transfer are managed so that no data is lost. In particular when the data collection and analysis device 14 wireless interface 44 detects a dropped packet (or other unit of communication) for the link between the sensor unit 18 and data collection and analysis device 14, the wireless interface 44 automatically sends a command to the sensor unit wireless interface 68 to resend the missing packet or a sequence of packets or the entire data collection measurement that was commanded by the data collection and analysis device 14—as per the wireless communication protocol.

The technician uses the displayed instructions 254 (see FIG. 9) to identify the test point location on the machine 12, and at step 212 mounts the sensor unit 18 at the appropriate location on the machine 12 associated with such test point. In some embodiments the machine to which the sensor unit 18 is removably mounted is turned off before mounting the sensor unit 18, then is turned back on once the sensor unit has been mounted. In other embodiments the machine is on and either running in a standby mode or operational mode while the sensor unit 18 is being mounted.

Once the sensor unit 18 is mounted and the machine is on, machine vibrations propagate into the sensor unit 18. The sensors 74/80 now can detect machine diagnostic data.

Figure 9:
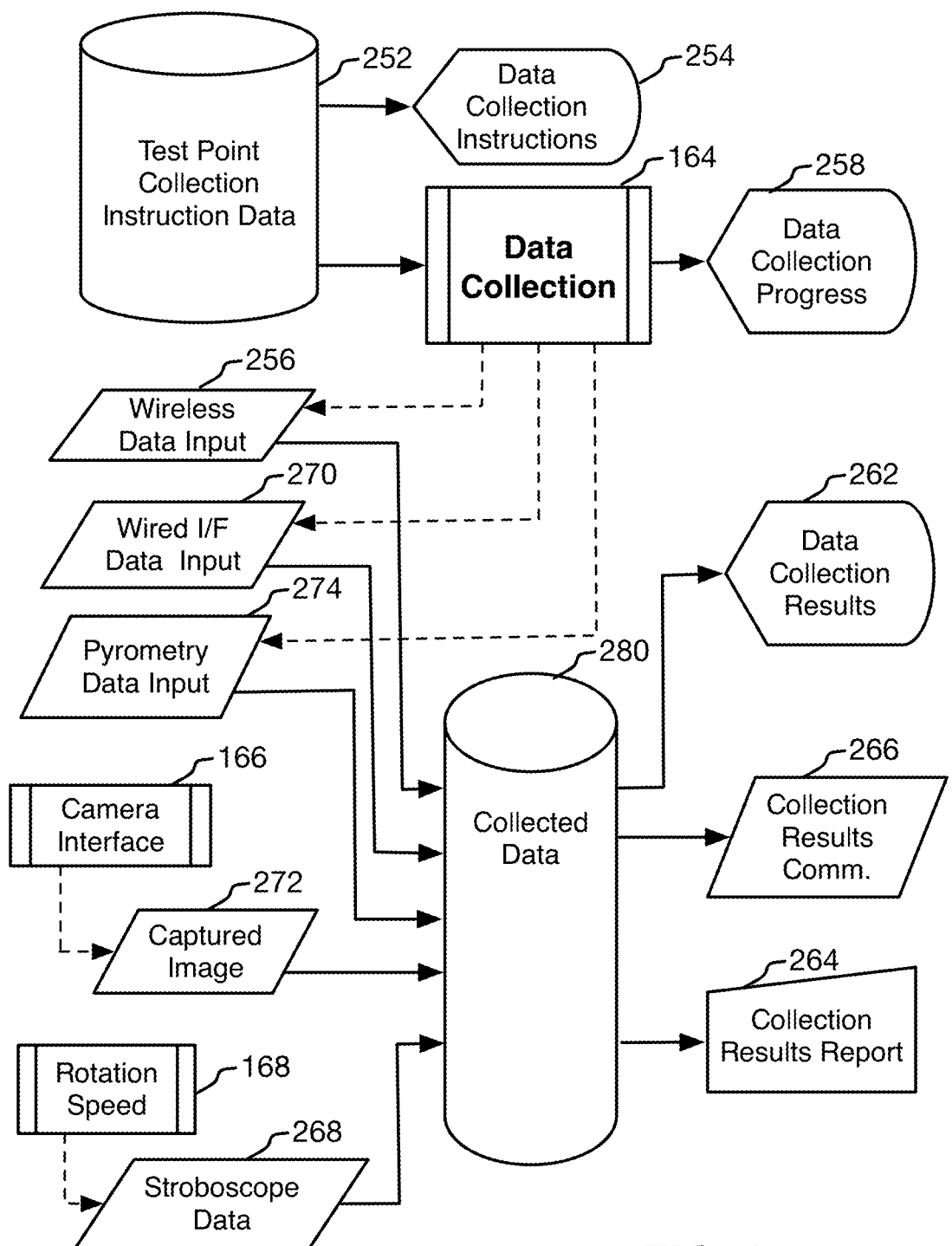
FIG. 9 is a data and control diagram of the data collection process of the data collection and analysis device.

Once the communication link 150 between the data collection and analysis device 14 and the sensor unit 18 is established and the sensor unit 18 is mounted, the technician can trigger the start of the data collection process 164. FIG. 9 shows a data and control flow of the data collection process 164. The technician enters a command to commence data collection at the test point from the sensor unit 18. The signal processor 77 of the sensor unit 18 responds to commands sent from the data collection and analysis device 14. The processor 30 may send a commend indicating that the signal processor 77 is to start collecting sensor readings from one or more sensors 74, 80 and have the raw sensor data transmitted to the data collection and analysis device 14. At step 218, the signal processor 77, for example, samples the sensors 79*a*, 79*b*, 79*c*, 80 at a predetermined (or commanded) rate for the specified sensor(s), and instructs the Wi-Fi interface 76 to transmit raw sensor data in real time. The signal processor 77 receives commands from the data collection and analysis device 14 to begin, pause or halt sending sensor data from a given sensor 79*a*, 79*b*, 79*c*, 80. A conventional Wi-Fi communication protocol is preferred for establishing a link, and for sending and receiving communications between the sensor unit 18 Wi-Fi interface 76 and the data collection and analysis device 14 Wi-Fi interface 44.

At step 220, the raw sensor data is streamed from the sensor unit 18 to the data collection and analysis device 14 via the wireless interfaces 44, 76 based on sensor readings sampling by the signal processor 77. The data collection and analysis device receives the wireless data 256. The data collection and analysis device 14 displays the progress 258 of the data collection on the display 33. The raw data received is stored as data collection results data 260.

During a measurement process for a test point location of a machine (e.g., data collection of accelerometer data from the test point location), the display 33 is configured to display a progress bar of the progress of the measurement, a time signal of the measurement (with scrolling enabled) and values of overall levels of the measurements. During such measurement process, the data collection and analysis device 14 maintains further functionality for the technician to interact through the user interface to select further operations. For example, software modules further configure the processor 30, touchscreen 15 and other components as needed to record via audio input interface 56, to capture a photograph with the camera 36 (i.e., visual light image, infrared light image), to playback previously recorded audio, or to display a photograph. For example, a technician will record and an audio comment, such as a note about the machine, the test point, or the data collection; or record the audio sound of the machine. Such audio note is automatically stored among the data collection results 230. As another example, the technician will operate the camera to capture an image 272 or motion picture, such as a visual image photograph or video clip. Inspection photographs or videos of the machine, the test point location, or the machine vicinity are taken and stored to document an oil leak, spill, or other visual condition of all or part of the machine, or to show a hazard at or in the vicinity of the machine. Such images (e.g., visible light image; infrared image) and videos are automatically stored among the data collection results 230 and included in the report 264 and communication 266 without further manual intervention by the technician.

When data collection for the test point is complete as determined automatically based on the software parameters in the setup module for the test point location, the processor 30 sends a command to the signal processor 77 to discontinue the streaming of the raw sensor data. At step 222 the signal processor 77 stops commanding the Wi-Fi interface 68 to stream the sensor data. When all data collection and analysis activities for the current test point location are complete, the technician dismounts the sensor unit 18 (at step 224), and in some instances either turns off the sensor unit 18 or leaves it on for use at the next or another test point.

In some embodiments the technician prints a report 264 of the data collection and analysis results or transfers the results in a communication 266 to the computing system 16 at the time of the completion for a given test point or machine. Typically, reports 264 and computing system 16 communications 266 are generated instead after completion of the entire route.

It is noted that the machines from which data is being collected need not be the same machine 12 specimen or model, and can be from different machines of a different type having different parts. The number of test points from which data is to be collected on any machine along the route may vary, and have different data collection instructions displayed to the technician. Of significance is that the same sensor unit 18 is mounted and dismounted for any, all or a subset of the test points on a given machine, or for any, all or a subset of the test points among any, all or a subset of all the machines. The ability to quickly mount and dismount the sensor unit 18, such as by simply placing the sensor unit (with magnetic mounting accessory) on the surface of the machine and simply pulling the sensor unit 18 from the surface of the machine, along with the ease with which the sensor unit 18 can be handled due to the omission of wires, provides an improvement in time efficiency and in technician and machine safety during the performance of each route.

Automatic Diagnosis

After data collection is complete for a given test point, the results 280 of the data collection are displayed (262 in FIG. 9), and the results 282 of the related automatic diagnosis are displayed (local analysis results 263 in FIG. 10; fault severity, fault confidence, recommendations, and warnings 394 in FIG. 11), as applicable. Automatic diagnosis is performed automatically in the background (or displayed in the foreground) during the data collection process or immediately thereafter as the data becomes available. Such automatic diagnosis is started automatically by the data collection process 164, as per data collection setup parameters. In particular among the machine setup data module 250 contents for a test point are controls for specifying which, if any, automatic diagnosis processes are to be performed on the data collected for the current test point (or machine). In other embodiments any one or more of the automatic diagnosis sub-modules 170-176 are executed according to the test point prescription. In some embodiments, the test point instructions include instructions for the technician to start the automatic diagnosis module(s). In preferred embodiments the automatic diagnosis module(s) are executed automatically without the technician manually starting execution of a technician selected sub-module 170-176.

Also included among the collection results 260 are the rotation speed results, when performed rotation speed processing 168 is performed on acquired stroboscope data 268 for a test point. Although wireless data 256 is collected, at another test point on the same route data 270 instead is collected through one of the wired data interfaces 50, 52, 54, and included among the data collection results 260 (and subsequently displayed, and/or included in a printed report or a communication). Also for some machines or test points, collections results data 260 include a photograph, video, or infrared image, as an image 272 captured by the camera 36 using the camera interface 166 software during collection of data for the current test point. Collection results data 260 also includes pyrometer data 274 when pyrometry is performed by the pyrometer 38 on the machine during collection of data for a current test point.

The automatic diagnosis module 158 and fault diagnosis module 160 are executed during or immediately after the pertinent data to be used for the diagnosis is collected. If the analysis fails, the technician may redo the data collection and analysis at such test point before advancing to the next test point of the route. When all data collection and analysis activities for the current test point location are complete, the technician dismounts the sensor unit 18 (at step 224), and in some instances either turns off the sensor unit 18 or leaves it on for use at the next or another test point.

The route companion module 154 then advances to the processing routines for the next test point for the current machine. Accordingly, instructions are displayed for collecting data from the next test point on the same machine 12. Steps 206-224 thus are repeated for the next test point using the same or a different sensor unit 18 or sensor 22. Automatic diagnosis and fault diagnosis is performed, as prescribed, at each test point and/or at the last test point for each machine 12. When all test point data collection and analysis is done for the machine 12, the route companion module 154 advances to the processing for the next machine 12. After data collection is complete for a given machine, the technician moves on to another machine along the route and repeat the steps (e.g. steps 202-224) again as needed to collect data from one or more test points on the next machine 12. Such repetitions continue as the technician goes from machine to machine until the end of the route.

Method for Automatic Fault Diagnosis with Confidence Level Indication

Fault detection as part of a diagnosis methodology applied to vibration data collected from a rotating machine is commonly implemented by threshold comparisons on given indicators according to the machine typology. The violation of a threshold by one indicator or a set of indicators corresponds to an identified fault. However, a threshold violation is not by itself an accurate, reliable decision tool for predicting whether a defect is in fact present. Accordingly, even though there have been advances in data collection and diagnosis, experts in vibration analysis still are needed to review collected data and automatic results. Without such experts to prescribe recommendations, machine diagnosis is less reliable and predictive maintenance programs are less effective.

According to an embodiment of the invention, a software-based expert analysis is implemented to improve reliability of automatic diagnosis and the efficient and effectiveness of predictive maintenance programs for machines. Such software-based expert analysis improves analysis performed locally without the need for the presence of a human expert in vibration analysis. In an example embodiment a Bayesian network is implemented in software to represent the probabilistic relationships between machine faults and their symptoms. For a given machine there is a naive Bayesian network with a portion thereof for each fault of the set of all potential faults for the machine. For each fault there is a fault definition used to configure the naive Bayesian network. The fault definition includes the set of characteristic symptoms for the fault, the corresponding indicator(s) for each characteristic symptom among the set of characteristic symptoms, and the weights for each one characteristic symptom of the set of characteristic symptoms. The naive Bayesian network for a fault includes the known probability of the fault on this type of machine, the set of characteristic symptoms and their respective weights, and the indicators that define each characteristic symptom for the fault, as discussed above in the description of the generation of the machine setup data module 250.

The set of potential faults to be diagnosed automatically for a machine is based on the machine topology, and preferably is limited to a set of common faults so as to achieve optimum reliability of the combined diagnoses for the machine. The presence or absence of certain components results in fault defect assumption. The set of fault defect assumptions defines the set of potential faults for a machine. Each indicator in the fault definition is used to diagnose a probability of whether a corresponding characteristic symptom is present. The symptom probabilities for a fault are used to derive a Bayesian probability value indicative of severity of the potential fault. Of particular significance is that the machine health is based on such Bayesian probability values for all of the potential faults of the machine, rather than on merely the violation of a threshold. Thus, rather than a set of alarms being generated and output for violations of corresponding thresholds, a probabilistic evaluation of a specific fault is diagnosed and output. Recommendations are generated automatically and displayed to the technician based on the patterns and confidence levels of the fault(s).

The fault diagnosis module 160 is executed by the data collection and analysis device 14 on-site at the time of data collection on diagnostic data 256, 268, 270, 274 collected from a machine 12 to identify faults from among a prescribed set of faults, along with confidence levels indicating the likelihood that the diagnosed faults are actually present in the machine 12. Such fault diagnosis is performed based on machine diagnostic data, including vibration data, collected from a given test point of a machine, from multiple test points of the machine, or from all the test points of the given machine. Such machine diagnostic data that is pertinent to the diagnosis of a given fault is based on the indicator defined in the fault definition for the given fault. Accordingly, the automatic fault diagnosis processes are performed in part or in whole, as applicable, after data collection from each test point, from select test points, and/or after data collection from all test points for the machine, according to the test points from which data for resolving the indicators for a given fault are needed.

Figure 10:
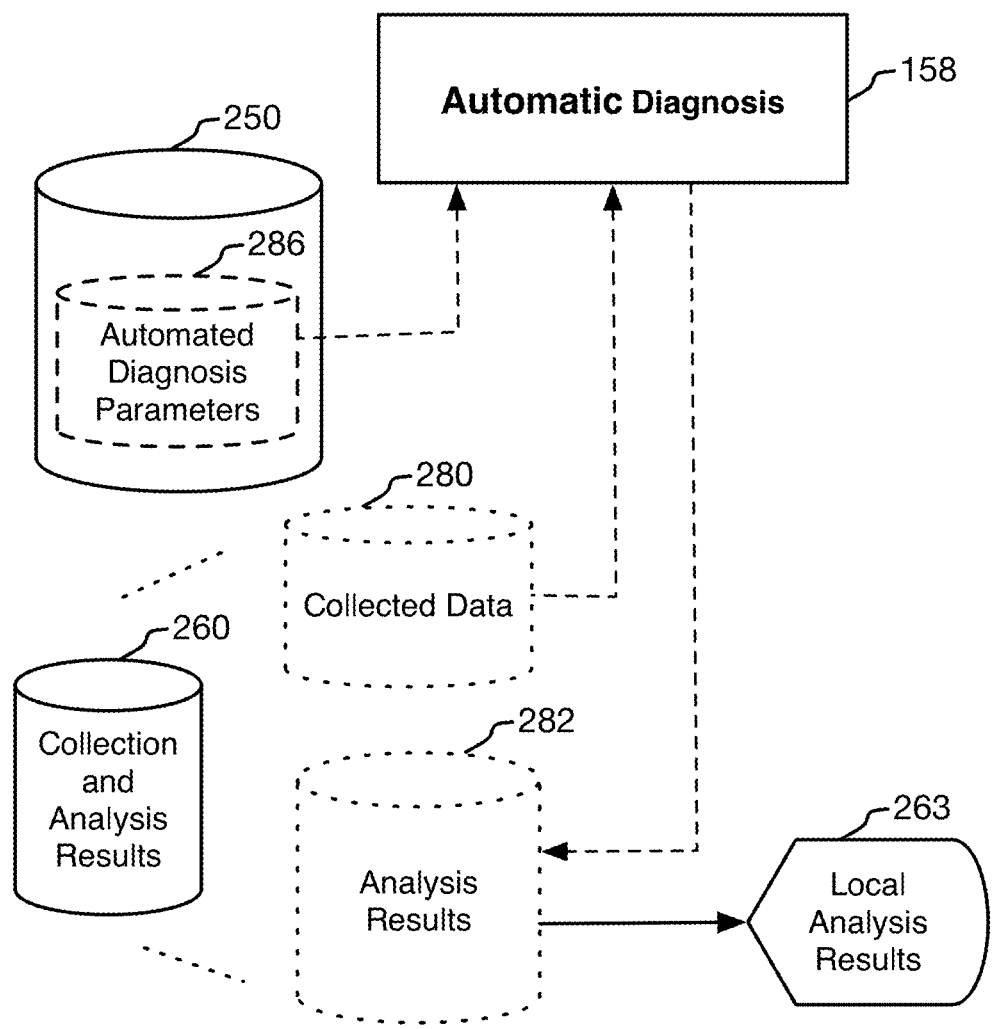
FIG. 10 is a data and control diagram of an automatic diagnosis process of the data collection and analysis device.
Figure 11:
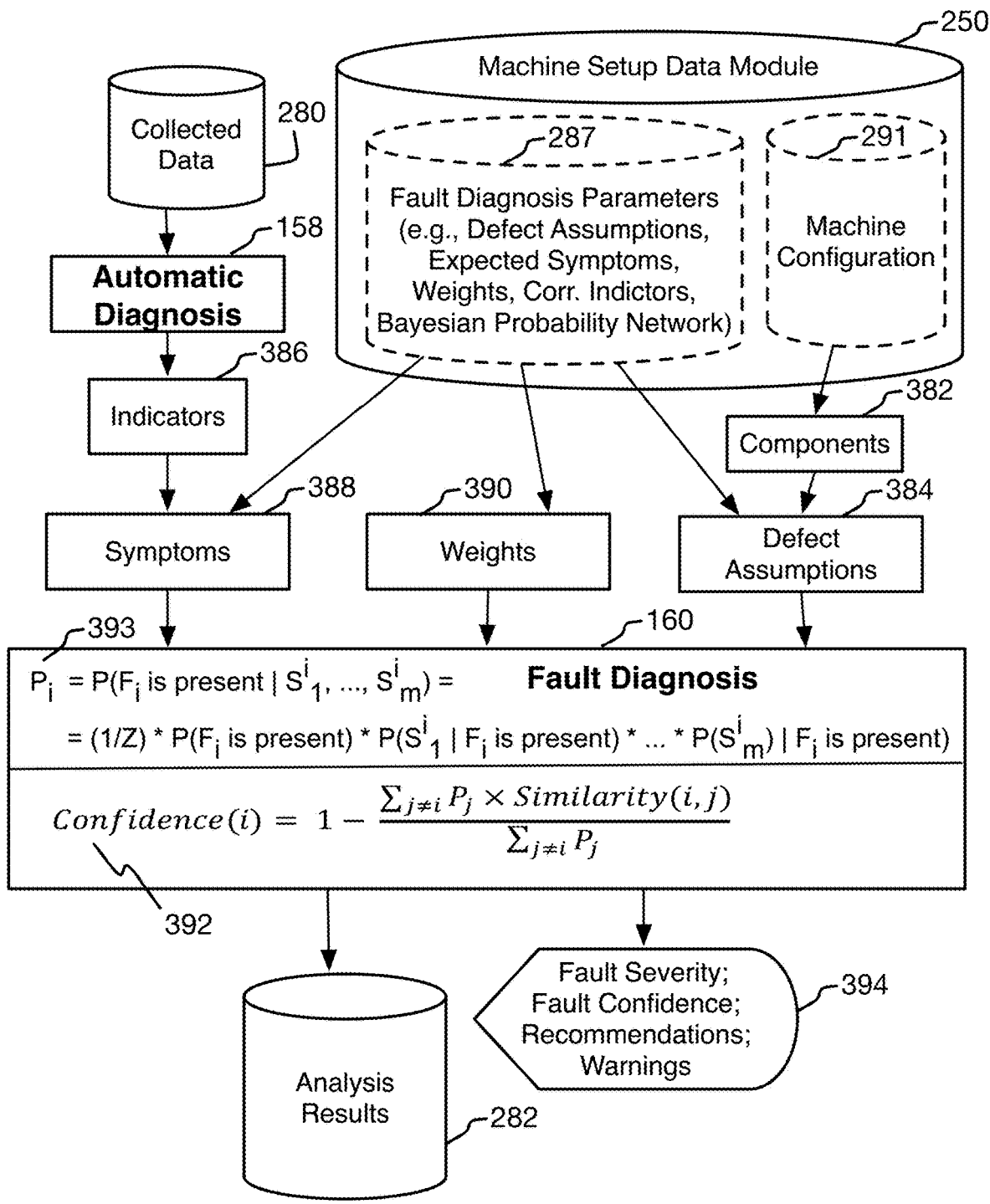
FIG. 11 is a data and control diagram of a confidence level determination process of the data collection and analysis device, according to an embodiment of the present invention.
Figure 12:
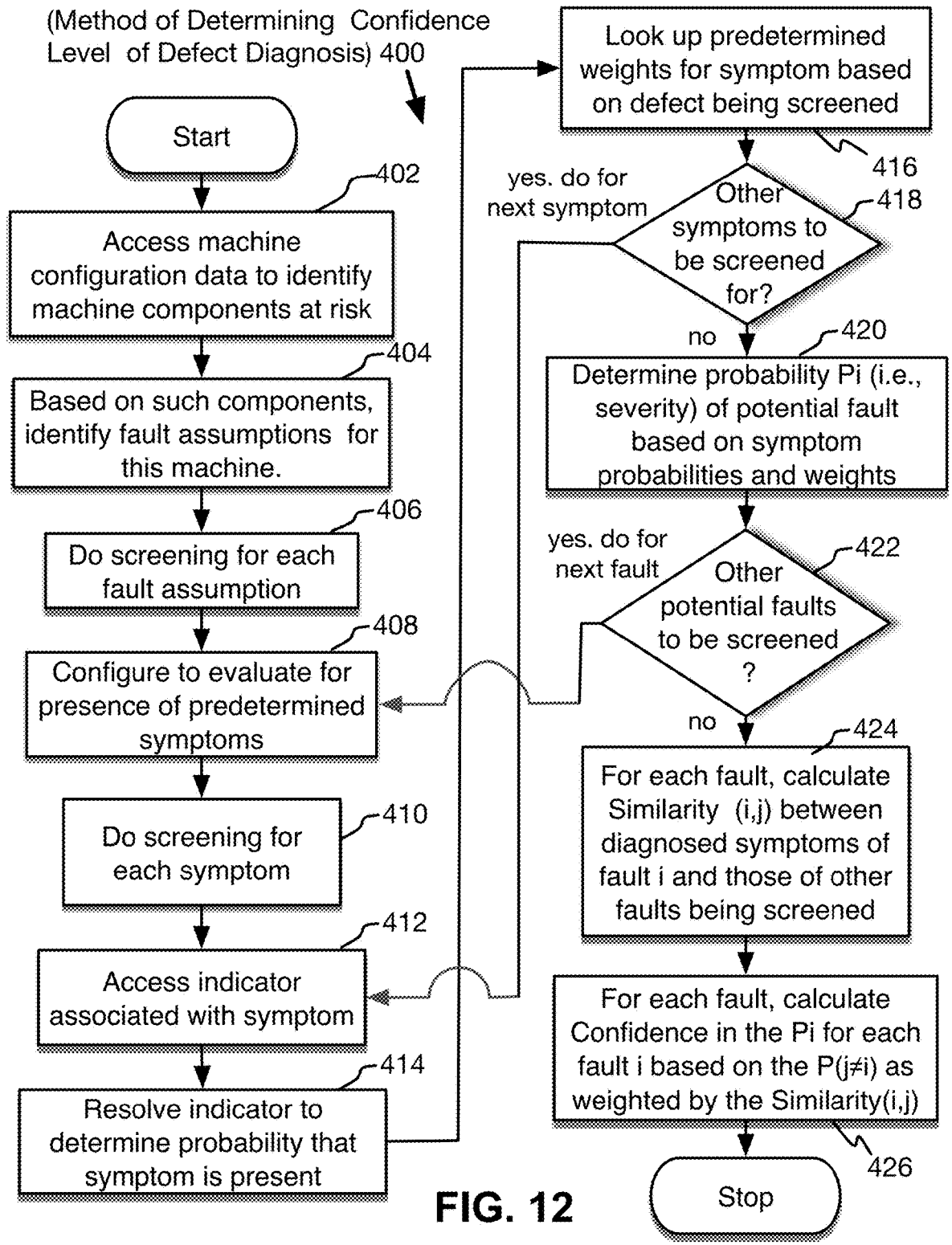
FIG. 12 is a flow chart of a method for detecting a confidence level of a fault diagnosis, according to an embodiment of the present invention.

A method 400 of fault diagnosis is described with regard to FIGS. 11 and 12. Inputs to the fault diagnosis module 160 include the collected data 280, the machine setup data from module 250, and automatic diagnosis analysis results 282 (FIG. 10). The raw machine diagnostic data 256, 268, 270, 274 stored as collected data 280 is processed by the automatic diagnosis module(s) 158 to achieve the analysis results 282. Among such collected data and analysis results are the data for resolving the indicators 386 used by the fault diagnosis module 260 for diagnosing symptoms. Among the machine setup data is machine configuration data 291 including identification of components 382 of the machine 12, which are pertinent to the fault diagnosis processes. Also among the machine setup data 250 are fault diagnosis parameters 287, including the Bayesian network of defect assumptions 384, characteristic symptoms 388, symptom weights 390, and the indicator definitions and indicator alarm thresholds (or parameters A, p) used to diagnose the presence of symptoms 388.

At step 402 the machine setup data module 250 is accessed to configure the data collection and analysis device 14 to execute the fault diagnosis module 160 for the current machine 12. In particular, the stored machine configuration 291 for the machine 12 is inspected to identify machine components 382. The components 382 are used to identify at step 404 the fault defect assumptions 384 for the machine 12. The presence or absence of a component directly determines whether or not there can be one or more corresponding potential faults. For example, for it to be possible for the machine 12 to experience a gear defect, the machine 12 must have a gearbox. For it to be possible for the machine 12 to experience a cavitation defect, the machine must have a pump.

There is an assumption for each type of fault to be diagnosed. The relationship between the assumption and the identification of the fault to be diagnosed is the same for any machine and remains unchanged over time. Accordingly, based solely on the components 382 and the fault defect assumptions 384 a set of potential faults that any machine 12 may experience during its useful life is identified. According to an embodiment of the present invention, the following types of fault defects provide the range of fault defects that may be included in a set of potential fault defects for a machine: mass Unbalance; misalignment; mounting defect; looseness; structural resonance; lubrication defect; rolling element bearings defects (Pitting, general wear); gear defects (tooth wear, broken tooth, backlash); and cavitation. In other embodiments additional or different types of fault defects are included. However, by limiting the set of potential faults that may be screened automatically to a set of common faults, the overall reliability of the automatic fault diagnosis module for determining machine health, diagnosing faults, and making automatic recommendations is found to be better. Other less common faults present in the machine are identified by other methods, such as by an experienced technician viewing the collected data and automated diagnosis module 158 results on-site or off-site.

There is a defect assumption for each such potential fault defect based upon the presence or absence of a corresponding component.

At step 406, screening of faults commences for the set of potential faults identified for the current machine 12. Screening occurs for each one fault among the set of potential faults. At step 408, the set of characteristic symptoms 388, stored in the machine setup data module 250 for machine 12, is loaded for the first fault of the set of potential faults to be screened. Each symptom 388 among the set of characteristic symptoms is to be screened to diagnose whether such characteristic symptom is currently present in the machine.

At step 410, screening of characteristic symptoms commences for the set of characteristic symptoms for the first fault among the set of faults. At step 412 the indicator definition for the first symptom of the set of characteristic symptoms is identified from the machine setup data module 250 for the current machine 12. At step 414, the indicator 386 is resolved with specific data according to the indicator definition. The resolved indicator value then is tested against criteria (e.g., an alarm threshold) so as to diagnose the first symptom. Following is a partial set of indicators 386 that are monitored by the automatic diagnosis modules 158:

"OVL ACC (g)": RMS Overall Acceleration
"OVL Velocity (mm/s)": RMS Overall Velocity
"ACC HF (g)": Value of the High Frequency Acceleration Energy band (g)
"ACC LF (g)": Value of the Low Frequency Acceleration Energy band (g)
"ACC MF (g)": Value of the Medium Frequency Acceleration Energy band (g)
"DEF": ACOEM Bearing Defect Algorithm, giving indication on the bearing health grade. (Similar to a crest factor)

"Shock": ACOEM Shock Detection Algorithm characterizing the presence of shocks (YES/NO)

"H0 (mm/s)": Amplitude of the First Harmonic of the rotation speed extracted on the velocity spectrum "H1 (mm/s)": Amplitude of the Second Harmonic of the rotation speed velocity spectrum "H2 (mm/s)": Amplitude of the Third Harmonic of the rotation speed velocity spectrum "H0 (dB)": Emergence of the First Harmonic of the rotation speed from the acceleration spectrum floor "H1 (dB)": Emergence of the Second Harmonic of the rotation speed extracted from the acceleration spectrum floor "H2 (dB)": Emergence of the Third Harmonic of the rotation speed from the acceleration spectrum "Ku": Kurtosis Other units of measure may be used for the indicators. The indicators above are provided as illustrative examples and are not meant to be the exclusive set of indicators used for fault diagnosis. In various embodiments additional indicators may be included. In some embodiments the indicators are based solely on current data collected from the machine during the current route. In other embodiments one or more of the indicators may be based on historical data previously collected from the same machine, while the other indicators are based on current data collected from the machine during the current route. In various embodiments the indicators are based on machine vibration data. In other embodiments one or more indicators is based on other machine diagnostic data, (e.g., pyrometer data; stroboscope data; tachometer data). In various embodiments one or more of the illustrative indicators may be omitted. Further, each indicator described above is only part of the indicator definition as applied to a specific symptom. An indicator as applied to a specific symptom is further defined by the test point location and the measurement direction (e.g., axial; radial; oblique; or x-, y-, or z-axis) for the raw data used to resolve the indicator, as appropriate. For example, H0 (mm/s), the amplitude of the First Harmonic of the rotation speed extracted on the velocity spectrum, is calculated for a specific symptom based on data collected from a specific test point. Such test point is defined during the machine setup data module configuration so as to acquire a data measurement from a specific direction. In an example case for one fault definition F(a) with an characteristic symptom K, the associated indicator for the symptom K is defined by the value for H0 (mm/s) as determined from data collected at test point TP1 where a radial measurement is taken. In another example case for a second fault definition F(b) that has an characteristic symptom L, the associated indicator for the symptom L is defined by the value for H0 (mm/s) as determined from data collected at test point TP2 where an axial measurement is taken. As a result the resolved value for the indicators will be different when testing the indicators to diagnose symptom K and symptom L, even though both rely on a determination of H0 (mm/s) in the indicator definition for the symptom. Further, even if a fault definition F(c) has the same characteristic symptom K and thus relies on an indicator also based on a radial measurement, the definition with regard to fault F(c) may specify that the data used is that collected from test point TP2—a different test point. As a result, the calculated value for the indicator will be different in some instances because the data source is from a different test point.

During the following description indicators are referred to by their name (e.g., ACC HF (g)). However, as described above, the indicator is further defined by the test point location and direction of measurement in order to resolve the value for the indicator.

A symptom 388 is defined as a probability value based on a fitting of the resolved indicator 386 to the sigmoid function for such symptom. For example, "Overall ACC HIGH" is a symptom, and "Overall ACC Low" is another symptom. A value for overall ACC is resolved according to the fault definition and a sigmoid function is applied to the resolved value (see FIG. 6) to determine a probability (P(S) of whether overall ACC is high. The parameters ($\lambda$, $\mu$) for determining the probability of what is a high overall ACC is part of the symptom definition for the characteristic symptom of the potential fault, and are stored in the machine setup data module 250.

As an example, for a mass unbalance fault the set of characteristic symptoms 388 includes: indicator OVL Velocity (mm/s) is high; indicator H0 (mm/s) is high; indicator H1 (mm/s) is high; indicator H2 (mm/s) is high; indicator ACC LF (g) is high; indicator Ku is low; indicator shocks is no; and indicator H0 (g) is preponderant, where each indicator is based on data obtained from measurements at a single test point location positioned to obtain radial measurements. Of such 8 symptoms, the indicator OVL Velocity (mm/s) is high, indicator H0 (mm/s) is high, and indicator H0 (g) is preponderant symptoms are primary symptoms and the other symptoms are secondary symptoms. Such set of 8 characteristic symptoms is the same for the mass unbalance fault for every machine. Further, when there are two mass unbalance defects to be tested on a machine (because there are two components triggering the defect assumption), the set of 8 characteristic symptoms is the same—although the test point location will differ (and therefore the resolved indictor values also may differ).

A probability of symptom presence is determined when the resolved value, is tested against prescribed criteria (e.g., an alarm threshold as relaxed by parameters $\lambda$, $\mu$ of the sigmoid function). While all the indicators for the mass unbalance fault are based on measurements from a single test point location and single direction, for other faults, the indicators may involve both radial measurement and axial measurements taken from multiple test point locations; or may involve x-axis, y-axis, and/or z-axis measurement obtained from a tri-axial accelerometer at a single test point location.

As another example, for the bearing defect the set of characteristic symptoms 388 includes: indicator OVL Velocity (mm/s) is high; indictor DEF is high; indicator ACC HF (g) is high; and indicator shocks is yes. The data used to resolve these four indicators is obtained from measurements at a common test point location positioned to obtain radial measurements. Of such 4 symptoms indicator OVL Velocity (mm/s) is high, indictor DEF is high, and indicator ACC HF (g) is high are primary symptoms. Indicator shocks is yes is a secondary symptom. Such set of 4 characteristic symptoms is the same for the bearing defect fault for every machine. In addition the weight assigned to each one symptom of the bearing defect fault is the same for every machine. The same applies for every fault. Specifically, the set of characteristic symptoms and their weights, along with the corresponding indicators used to diagnose the symptoms are the same on every machine and for every machine configuration for a given fault. The resolved values for the indictors may differ. In addition, the number of test point locations from which the measurements are to be taken and the directions for such measurements also are the same for each machine and machine configuration for a given fault. In addition, a given machine may have a plurality of the same component. As a result, a machine with two sets of bearings has two "bearing defects" among the set of potential fault defects to be screened for the machine. The test point locations are different for the two, but the characteristic symptoms, the indicators, and the symptoms weights are the same. In addition, for both faults the measurements performed to collect the data for all four indicators are from one test point location for one of the bearing defects and from another test point location for the other of the bearing defects. Such measurements are from a common direction of measurement (e.g., radial) for both bearing defects at the respective test point locations.

At step 416 the pre-assigned weights 390 are loaded for the characteristic symptom 388 being screened. Such weights 390 are determined from the naive Bayesian network for the current fault as described above, and are always the same for such symptom in connection with such fault. For example, if the same fault occurs two times among the set of potential faults for a machine, then the symptom has the same respective weights as applied to each of the two faults. If the same fault occurs among the set of potential faults for two different machines, then the symptom has the same respective weights as applied to the fault for each machine, regardless of differences in the machine configurations. Further, the Bayesian network for a given fault is the same for any machine of a given machine type, and is the same for each occurrence of the fault among the set of potential faults for the given machine.

The weights assigned to an individual one characteristic symptom among the set of characteristic symptoms associated with a fault vary according to how important the symptom is to the diagnosis of the fault. For example, for the mass unbalance fault, the radial component symptoms indicator's OVL Velocity (mm/s) is high, indicator H0 (mm/s) is high, and indicator H0 (dB) is preponderant are the primary contributing symptoms to the diagnosis of the mass unbalance fault and accordingly are assigned higher weights than the other 5 symptoms forming the Bayesian network for the bearing defect. As another example, for the bearing defect, the radial component symptoms indicator OVL Velocity (mm/s) is high, indictor DEF is high, and indicator ACC HF (g) is high are the primary contributing symptoms to the diagnosis of the bearing defect and accordingly are assigned higher weights than the other symptom forming the Bayesian network for the bearing defect.

At step 418 a determination is made as to whether there are other symptoms among the set of characteristic symptoms for the current fault to be screened. If there is another characteristic symptom among the set to be screened, then steps 412-418 are repeated. Iterations of steps 412-418 continue until all of the characteristic symptoms are screened for the current fault.

Once all the characteristic symptoms for the current fault have been screened, then at step 420, the Bayesian probability P(i) 393 for the current fault i is determined. Such probability is stored among the analysis results 282. The Bayesian probability for fault Fi is an indication of severity of the current fault, and is determined by equation (1) above.

At step 422 a determination is made as to whether there are other faults to be screened among the set of potential faults for the current machine. If there is another fault to be screened, then steps 408-422 are repeated for the next fault. Iterations of steps 408-422 continue until all of the potential faults among the set of potential faults for the current machine are screened.

At step 424-426 the confidence level for each fault is derived. The derived confidence levels are stored among the analysis results 282. The derivation is based on a plurality of similarity values computed by the processor for each fault with respect to each other fault. For example, for a set of four potential faults being screened for a machine, there are three similarity values calculated for each of the four potential faults. For a first fault, there is one similarity value with respect to each of the other three faults among the set of four, regardless of whether any of such potential faults are diagnosed. Therefore, there are 12 similarity values in total derived for the example of four potential faults of a machine. The similarity value for first fault i with respect to a second fault j is based in part on an intersection of characteristic symptoms for the first fault and the second fault. More specifically it is derived by equation (2), as follows:

$$\text{Similarity}(i, j) = \frac{\text{InterCount}(i, j)}{\text{UnionCount}(i, j)}$$

$$\text{InterCount}(i, j) = \sum_{k \in (S_i \cap S_j)} 1 - |w(i, k) - w(j, k)|$$

and $$\text{UnionCount}(i, j) = \|S_i\| + \|S_j\| - \text{InterCount}(i, j)$$

and where $w(i,k) \in [0,1]$ is the probability that characteristic symptom k of fault i is present, (i.e., $P(S^i_k)$ as discussed above with regard to the naive Bayesian network); and $\|S_i\|$ denotes the number of characteristic symptoms in the set $S_i$ of characteristic symptoms for fault i.

The Intercount is based on the determined probabilities (i.e., $P(S^i_k)$) for the characteristic symptoms that are common to the definitions of faults i and j, (i.e., an intersected set of symptoms). For example, in a case where potential fault $F_i$ has 8 characteristic symptoms; potential fault $F_j$ has 6 characteristic symptoms; $F_i$ and $F_j$ have two characteristic symptoms in common; the weights of the first common characteristic symptom are 0.2 and 0.3 for the faults i and j, respectively; and the weights of the second common characteristic symptom are 0.25 and 0.2 for the faults i and j, respectively; then the Intercount (i,j) is 1−[(0.3−0.2)+(0.25−0.2)], which is 0.85. The Unioncount (i,j) in such case is 8+6−0.85=13.15. The Similarity (i,j) for such example is 0.85/13.15=0.065.

The confidence level for fault $F_i$ is computed as the complement to '1' of the sum of all the similarity values of the fault $F_i$ against all the other faults $F_{j \neq i}$ weighted with the probability of occurrence of each other fault $F_{j \neq i}$. Thus, a fault $F_i$ that has high similarity values with the other faults will have a confidence level close to zero, while a fault with low similarity values with the other faults will have a confidence level close to one. The confidence level C(i) for a fault $F_i$ among the set of potential faults for the current machine is derived by the equation (3) as follows:

$$C(i) = 1 - \frac{\sum_{j \neq i} P_j \times \text{Similarity}(i, j)}{\sum_{j \neq i} P_j}$$

The confidence level, C(i), is a function of the similarity values derived for fault i and the Bayesian probabilities determined for all the potential faults, except fault i. For example, where the similarity values derived for fault i are 0.065, 0.15, and 0.35 and the Bayesian probabilities for the potential faults other than fault Fi are 0.6, 0.7, 0.8, the confidence level for fault Fi is C(i)=1−{[(0.6*0.065)+(0.7*0.15)+(0.8*0.35)]/[0.6+0.7+0.8]}=1−{[0.039+0.105+0.28]/[2.1]}=1−0.202=0.798. Accordingly, the confidence level for a fault i is based on the probabilities for the other faults; the number of characteristic symptoms in common between fault i and each of the other faults, respectively (i.e., intersection); the weights for such common symptoms; the total number of characteristic symptoms for fault i; the total number of characteristic symptoms for each of the other potential faults of the machine; and the number of symptoms in the union set of characteristic symptoms for all the potential faults of the machine being screened. A confidence level is derived for each one potential fault among the set of potential faults being screened for the current machine 12.

The Bayesian probability for each potential fault is used to determine a qualitative severity assessment for the potential fault. For a potential fault where the Bayesian probability is less than 0.51, the potential fault is not diagnosed as being present for the machine 12. Where the probability is $0.51 \leq Pi < 0.65$, a first severity level is indicated (e.g., a yellow flag) on a report or display. Where the probability is $0.65 \leq Pi < 0.80$, a second severity level is indicated (e.g., an orange flag) on a report or display. Where the probability is 0.80, highest severity level is indicated (e.g., a red flag) on a report or display. In various embodiments the number of intervals into which the probability is divided for reporting the severity assessment and the size and boundaries of such intervals vary.

The confidence level for each potential fault is used to determine a confidence indicator for the potential fault. For a potential fault where the confidence level is less than 0.5, the presence of the fault is doubtful, so the potential fault is not diagnosed as being present regardless of the P(i) value for such potential fault. Accordingly, a potential fault is not diagnosed when either one of the following conditions are met: its Bayesian probability is less than a prescribed value (e.g., 0.51), or its confidence level is less than a prescribed level (e.g., 0.5). When the confidence level for fault i is $\geq 0.875$ (and the probability is $\geq 0.51$), the confidence indicator indicates certainty of the presence/diagnosis of the fault i. When the confidence level for fault i is $0.75 \leq Ci < 0.875$, (and the probability is $\geq 0.51$), the confidence indicator indicates a high probability of the presence/diagnosis of the fault i. When the confidence level for fault i is $0.625 \leq Ci < 0.75$, (and the probability is $\geq 0.51$), the confidence indicator indicates a good probability of the presence/diagnosis of the fault i. When the confidence level for fault i is $0.5 \leq Pi < 0.625$, (and the probability is $\geq 0.51$), the confidence indicator indicates that the presence/diagnosis of the fault i is suspect. In various embodiments the number of intervals into which the derived confidence level is divided for reporting purposed and the size and boundaries of such intervals vary. For diagnosed faults detected as suspect due to the relatively low confidence level, additional warnings (e.g., among the fault severity, fault confidence, recommendations, and warnings 394 in FIG. 11) are presented to the technician in some embodiments suggesting the technician request a complementary analysis by a technician experienced in vibration analysis to confirm the fault defect before taking any maintenance action.

Method for Linking Photograph with Test Point Location

A method also is provided for improving identification of test points so as to assure the sensor unit is mounted according to an appropriate orientation to properly align axes of a tri-axial accelerometer. Such method reduces mis-identification of a machine or test point, mal-positioning of the sensor unit.

Condition monitoring of a rotating machine using vibration analysis helps to determine and forecast the evolution of a health grade of a machine through trend analysis. To do so, vibration measurements are collected on a periodic basis. To be reliable for determining a trend, however, the position of the sensor unit 18 should be identical from one control measurement on one day during one route to another control measurement of the same control at another time, such as on another day during another or the same route to ensure any difference in the measurements are due to the machine vibrations and not the position or orientation of the sensor unit With the global social trend of vibration analysis, industries applying test point monitoring for conditions have less and less qualified personnel (having the required knowledge of vibration analysis) to perform the measurements in an effective manner. In addition to the personnel qualification, companies also tend to outsource the data collection service. Thus, machine diagnostic data collection often is performed by different people at different times. Accordingly, there is a need for assuring that the sensor unit 18 will be put in the same position (at the same orientation) on the machine. Satisfying such need is a prerequisite for effective trend analysis of machine diagnostic data monitoring.

Using the embedded camera 36, the data collection device 14 allows the technician to take a picture of the sensor unit's position. The data collection device 14 processing then associates automatically the captured photograph with the current test point. The photograph then is displayed automatically on display 33 to the technician each time data collection is performed for such test point. Such photograph is a simple to understand effective display of information useful for assuring that the sensor unit 18 is mounted in the same position every time for the specific test point, whoever is performing the data collection. Accordingly, the data collection device 14 improves the reliability of the vibration analysis or other diagnosis performed by other personnel or by an automatic expert system, based measurements collected over time from the given test point of the given machine.

The data collection device 14 also allows a technician any moment during data collection setup and acquisition to take inspection photographs or videos of the current machine using the embedded camera 36 to illustrate observed phenomenon or environmental conditions. Such photographs and videos are automatically stored along with the vibration data as data collection results data 260 and printed out automatically in the corresponding report 264 or upload 266 without any additional manual intervention. In some embodiments an audio input also is provided enabling the video to include audio.

Establishing the diagnosis of a rotating machine is a complex part of a vibration analysis service. Other types of data can be relevant and helpful to improve diagnosis productivity and reliability. The data collection device 14, as embedded with the infrared module of the camera 36, allows the technician to capture infrared images of the machine 12, and have the images stored automatically along with the collected vibration data. The settings (e.g., EM spectral range) for the captured infrared image(s) are automatically included in the data collection results 260 with the infrared image and automatically uploaded to a vibration analysis software module on the computing device 16 in a communication 266, and automatically printed out in the report(s) 264, along with the vibration data and other data collection results 260.

Figure 8:
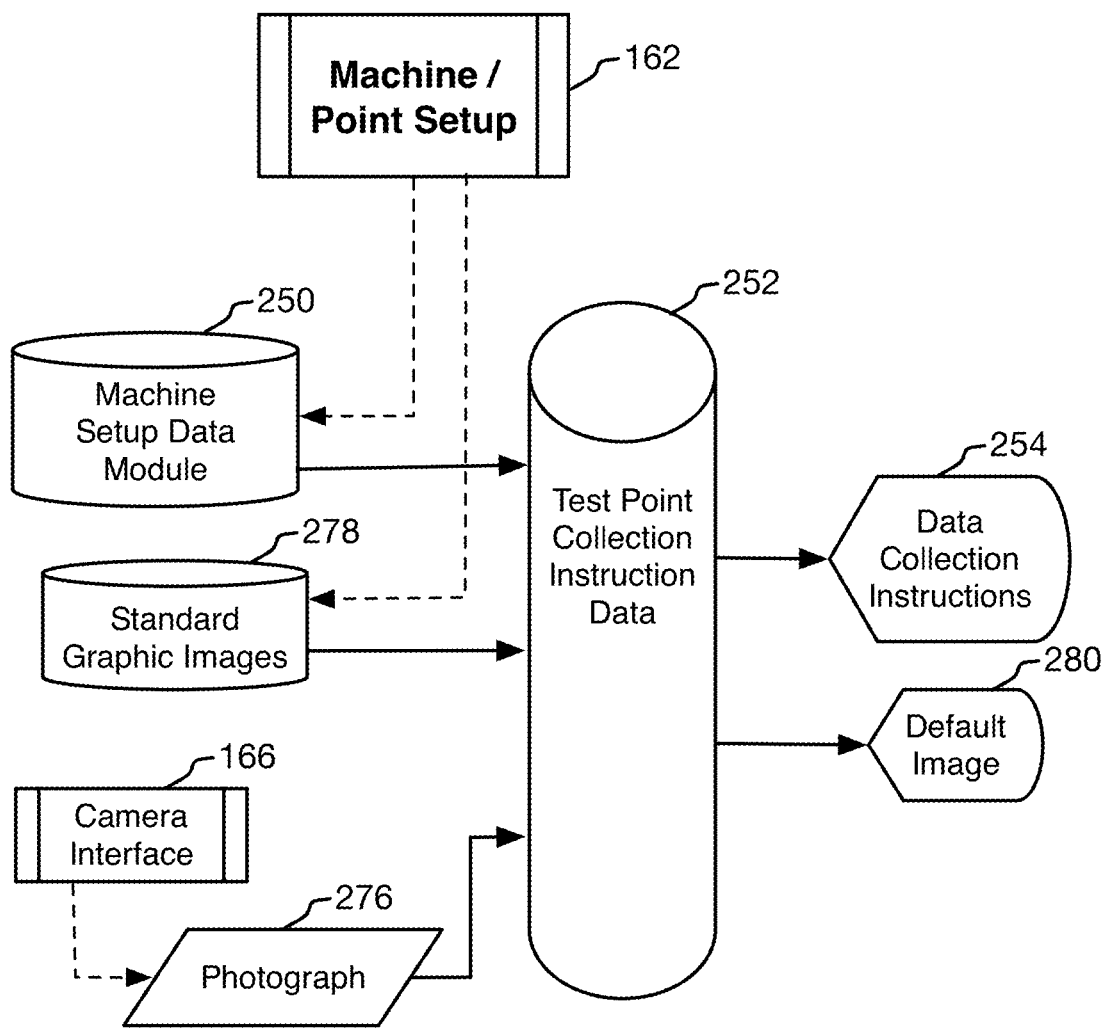
FIG. 8 is a data and control diagram of the machine/test point setup process of the data collection and analysis device.

To provide such capabilities, at any time during a route, the technician can access the camera interface software 166 to take a picture. In some instances the technician takes a photograph of the machine, the test point location, or the machine vicinity to document an oil leak, spill, or other visual condition of all or part of the machine, or to show a hazard at or in the vicinity of the machine. At other instances the technician takes a photograph to use as a future aid for mounting the sensor unit and collecting data from the test point at another time during another performance of the same or a different route. The first type of photograph pertains to the specific performance of the route, (e.g., environmental conditions on a given date). The second type of photograph pertains to every time data is to be collected from the specific test point of the specific machine that was photographed, (e.g., the sensor unit orientation for the specific test point on the specific machine). The first type of photograph (e.g., captured image 272 at FIG. 9) is stored with the data collection results 260 for the current performance of the current route, and is included in the report 264 or communication 266. The second type (e.g., photograph 276—see FIG. 8) is stored with the test point data collection instruction data 252 for the current test point of the current machine from which data is collected and used during subsequent setups for such test point.

Handling of a photograph captured using the camera interface module 166 as the first type or the second type is based on the procedure the technician uses to call the camera interface module 166. A normal manner of accessing the camera is to access the toolbar user interface. For such photographs, the photograph (e.g., captured image 272 at FIG. 9) is treated as the first type and stored with the data collection results 260 for the current performance of the current route.

Figure 13:
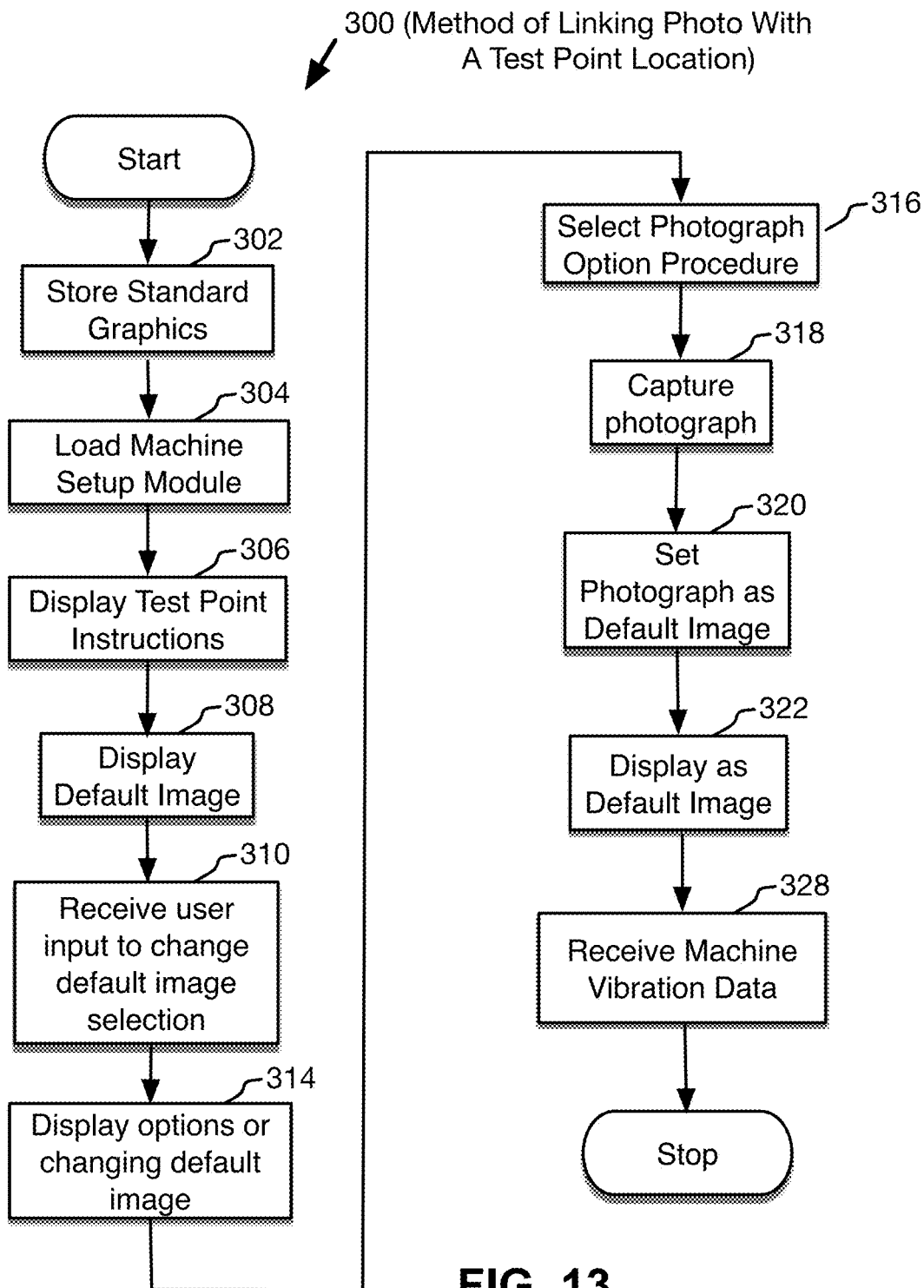
FIG. 13 is a flow chart of a method for linking a photograph with a test point location, according to an embodiment of the present invention.
Figure 14:
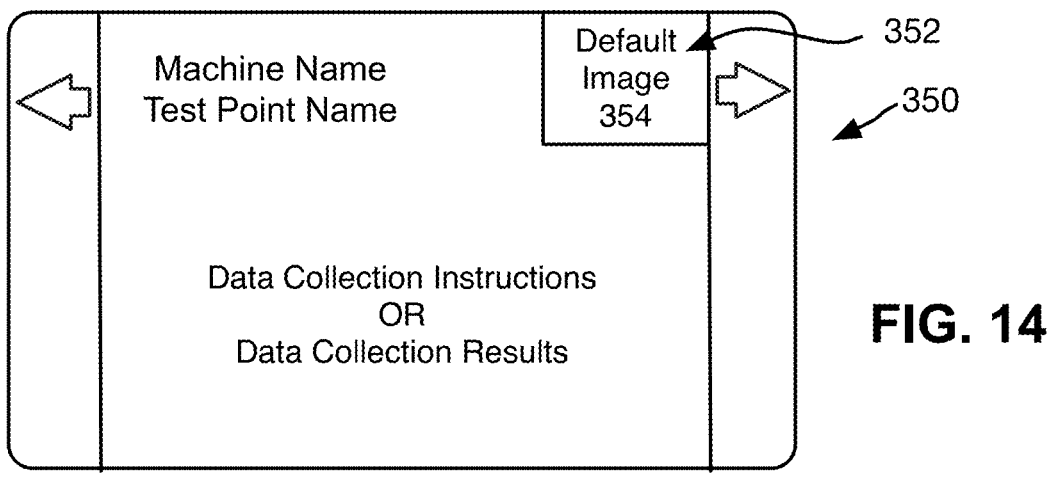
FIG. 14 is an illustration of a data collection instructions displayed-content-screen (and data collections results screen) of a display of the data collection device, according to an embodiment of the present invention.
Figure 15:
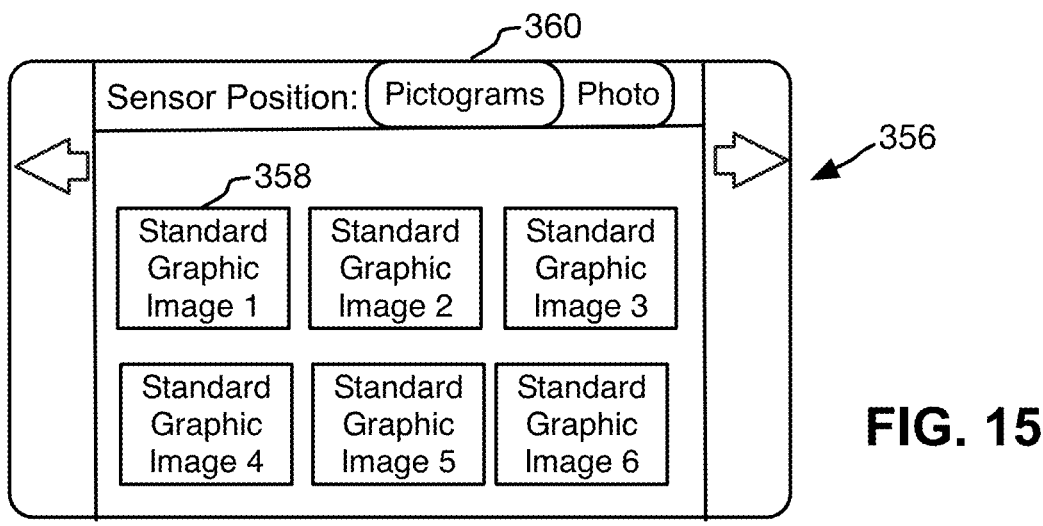
FIG. 15 is an illustration of sensor position image selection first screen of a display of the data collection device, according to an embodiment of the present invention.

Photographs of the second type are linked instead with the test point instructions and parameters and by a different procedure. FIG. 13 is a flow chart of a method 300 for linking a photo with a test point prescription. At step 302 graphics are pre-stored in the data collection device 14 memory, such as prior to performance of a route. After the data collection instruction data 252 is loaded for the current machine at step 304, instructions 254 are displayed for a current test point at step 306 on a data collections instructions screen 350 (FIG. 14). On the same screen a portion of the screen includes an image area 352 for a visual aid. The visual aid is to show the technician how the sensor unit 18 or sensor 22 is to be mounted at the test point. A default image 354 is displayed within the visual aid image area at step 308. In some instances no default image may have been selected yet or a prior selection may have been cancelled. In such case the image area is blank or includes some placeholder image. The technician clicks on the image area to change the contents of the visual aid image area. At step 310 the input is received and processed resulting at step 314 in the displaying of a set of standard graphic images on display 33 at a default image selection screen 356 (FIG. 15), such as pictograms 358 or icons. Each image depicts a different orientation for mounting the sensor unit 18 or sensor 22 relative to a reference surface, (i.e., corresponding to that of any machine). One pictogram illustrates the sensor having an orientation where the sensor z-axis corresponds to one mounting orientation relative to the machine. Another pictogram illustrates the sensor having a second, different orientation where the sensor z-axis corresponds to a different mounting orientation relative to the machine. Another pictogram illustrates the sensor mounted to one location on a mounting fixture of the machine. Another pictogram illustrates the sensor mounted to another location on the mounting fixture (for the same test point location) of the machine and corresponding to a different orientation of the sensor axes relative to the machine. These graphic images are standard in the sense that they are available for display for the technician to choose from for any test point of any machine where the setup process 162 for the test point instructions uses a screen template having such a visual aid area for showing the default image. The technician clicks on a desired one of the standard graphic images and closes the window. The selected standard graphic image then is displayed in the visual aid image area for that specific test point. The selected standard graphic image now is the default image for the visual aid area for that test point of that machine from then on, until changed. Thus, during any subsequent performance of the route, or another route, or for an off-route data collection of that test point of that machine, the selected standard graphic image will be displayed automatically with the data collection instruction on the data collection instructions screen (e.g., when a template including a visual aid image area is used to generate the screen).

Figure 16:
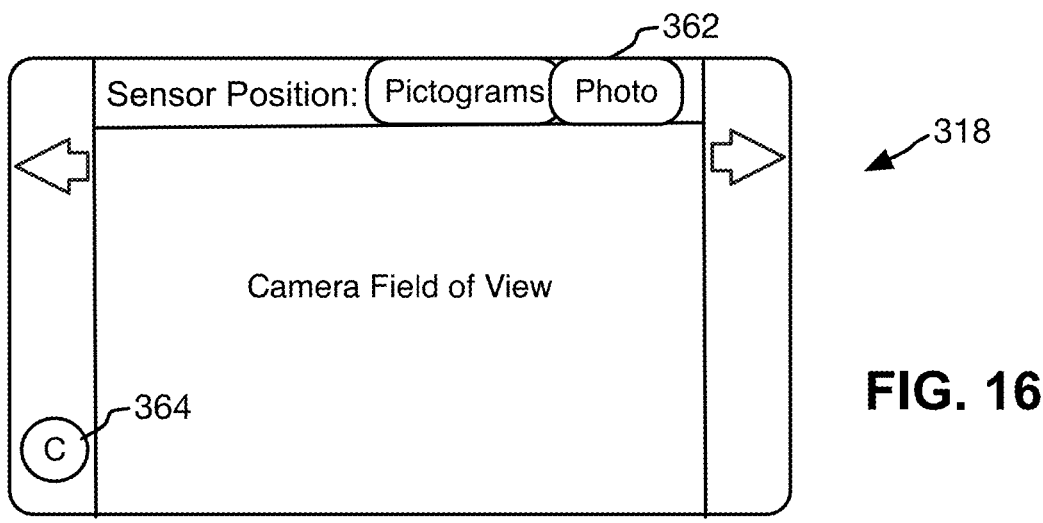
FIG. 16 is an illustration of sensor position image selection second screen of a display of the data collection device, according to an embodiment of the present invention.

When the technician clicks on the visual aid image area and is shown the set of standard graphic images, the technician also has the opportunity, instead of selecting from among the standard graphic images, to open the camera interface from that screen to take a photograph. In an example embodiment the set of standard graphic images are associated with one browser-like tab 360. A second tab 362 (FIG. 16) selects a procedure to take a photograph to be used instead as the default image for the visual aid area. The technician clicks on such tab at step 316 and the camera field of view is displayed within all or a portion of the screen of display 33. The technician aims the data collection device 14 and thus the embedded camera lens, then clicks on a control 364 to take a photograph (at step 318). The captured photograph 27 is stored at step 320 as the default image for the visual aid area for that test point of that machine from then on, until the default image is changed. When the technician closes the camera field of view screen, the photograph is displayed at step 322 in the visual aid portion 352 of the screen 350 of the data collection instructions. During any subsequent performance of the route, or another route, or for an off-route data collection of that test point of that machine, the captured photograph is displayed automatically as the default image 354 among the data collection instructions on the data collection instructions screen 350 (e.g., when a template including a visual aid image area is used to generate the screen), until the default image 354 is changed to another photograph or to one of the standard graphic images using the procedures described. In addition the technician can cancel a default image selection and return to a blank or placeholder image in the visual aid area.

In some embodiments the visual aid image area 352 with the default image 354 therein remains on screen during data collection. By clicking on the image area 352 the same procedure can be followed to change the default image 354. Accordingly, in some embodiments a photograph for showing the sensor position at the current test point of the current machine can be taken at any time during the data test point setup and data test point collection processes and be set as the default image.

OTHER REMARKS

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. The invention is intended to extend to all functionally equivalent structures, methods and uses, such as are within the scope of the appended claims. Those skilled in the art, having the benefit of the teachings of this specification, may affect numerous modifications thereto and changes may be made in form and details without departing from the scope and spirit of the invention.

What is claimed is:

1. A rotating-machine fault diagnostic system comprising:
a rotating machine comprising a housing and a plurality of select parts, the plurality of select parts including a shaft, a rotor and a bearing, the rotating machine having a plurality of test points;
a sensor unit that collects diagnostic data of the rotating machine when mounted at any test point of said plurality of test points;
a portable data collection and analysis device comprising a processor, a memory, an embedded camera, and a display;
a photographic image stored in memory for each one test point of the plurality of test points, said photographic image depicting an appropriate sensor unit position and an appropriate sensor unit orientation for data collection by said sensor unit at said one test point;
wherein said portable data collection and analysis device is configured to perform the steps of:
determining a machine configuration corresponding to the plurality of select parts present on the rotating machine by identifying the rotating machine based on one of either an operator input or by receiving a signal from a scan of a code embedded on the rotating machine;
for each one test point of the plurality of test points to be tested with said sensor unit,
loading a test point prescription for said one test point, said one test point being a location on the rotating machine for diagnosing a corresponding select part among the plurality of select parts of the rotating machine,
displaying setup instructions from the test point prescription for installing said sensor unit at said one test point,
the processor loading and the display displaying a corresponding photographic image from the photographic images stored in memory that shows said appropriate position and orientation for positioning and orienting at said one test point said sensor unit, wherein said sensor unit at said one test point is removably mounted by an operator so as to be in accordance with said appropriate position and orientation shown in said corresponding photographic image and said setup instructions;
receiving diagnostic data from said sensor unit for said one test point while mounted at said one test point;
configuring the portable data collection and analysis device to represent the machine configuration of the identified rotating machine as a naive bayesian network which is independent of the received diagnostic data;
for each one part of said plurality of select parts to be evaluated using said sensor unit,
deriving a probability of presence of a potential fault for said one part based on the received diagnostic data and the naive bayesian network, said potential fault having one or more characteristic symptoms, and each one of said one or more characteristic symptoms having a symptom weight, and
determining a confidence level C(i) for presence of said potential fault i for said one part as follows:

$$C(i) = 1 - \frac{\sum_{j \neq i} P_j \times \text{Similarity}(i, j)}{\sum_{j \neq i} P_j}$$

where $P_j$ is the derived probability of presence of potential fault j; and $$\text{Similarity}(i, j) = \frac{\text{InterCount}(i, j)}{\text{UnionCount}(i, j)}$$

where $$\text{InterCount}(i, j) = \sum_{k \in (S_i \cap S_j)} 1 - |w(i, k) - w(j, k)|$$

and $$\text{UnionCount}(i, j) = \|S_i\| + \|S_j\| - \text{InterCount}(i, j)$$

and
where $w(i, k) \in [0,1]$ is the probability that characteristic symptom k of potential fault i is present;
$\|S_i\|$ denotes the number of characteristic symptoms in the set $S_i$ of characteristic symptoms for the potential fault i; and
$\|S_j\|$ denotes the number of characteristic symptoms in the set $S_j$ of characteristic symptoms for potential fault j,
wherein a greater dis-similarity between sets of characteristic symptoms, as weighted, for said potential fault i and said potential faults for each other part of said select parts corresponds to a higher confidence level; and
diagnosing that said one part has a corresponding deteriorating condition, when the probability of presence P of said potential fault i for said one part exceeds a first prescribed threshold and the confidence level for the probability of presence P of said potential fault i for said one part exceeds a second prescribed threshold.

2. The system of claim 1, wherein said portable data collection and analysis device is configured to perform image capturing, including for each one test point of said plurality of test points the steps of:
capturing with said embedded camera said corresponding photographic image by imaging said one test point on the machine as configured to show said appropriate sensor unit position and said appropriate sensor unit orientation for the sensor unit; and
storing said photographic image in memory.

3. The system of claim 1, wherein the portable data collection and analysis device is configured to perform the further step of:
displaying a recommendation to perform maintenance on said one part based on the diagnosis that said one part has a corresponding deteriorating condition.

4. The system of claim 1, wherein the portable data collection and analysis device is configured to perform the further step of:
  displaying a warning recommending that complementary analysis be performed when the probability of presence of said potential fault for said one part exceeds the first prescribed threshold and the corresponding confidence level does not exceed the second prescribed threshold.

5. The system of claim 1, wherein the sensor unit is a sensor and further comprising a wire that connects the sensor to the portable data collection and analysis device.

6. The system of claim 1, wherein the portable data collection and analysis device further comprises a pyrometer;
  wherein said portable data collection and analysis device is configured to further perform receiving diagnostic data from said pyrometer; and
  wherein among the characteristic symptoms of said potential fault i of said one part is a first characteristic symptom based on diagnostic data received from the pyrometer.

7. The system of claim 1, wherein the portable data collection and analysis device further comprises a stroboscope;
  wherein said portable data collection and analysis device is configured to further perform receiving diagnostic data from said stroboscope; and
  wherein among the characteristic symptoms of said potential fault i of said one part is a first characteristic symptom based on diagnostic data received from the stroboscope.

8. The system of claim 1, wherein said diagnositc data comprises machine vibration data that represent sample measurements of vibration of the rotating machine.

9. The system of claim 1, wherein said diagnositc data comprises machine temperature data that represent sample measurements of temperature of the rotating machine.

10. A rotating-machine fault diagnostic system comprising:
  a rotating machine comprising a housing and a plurality of select parts, the plurality of select parts including a shaft, a rotor and a bearing, the rotating machine having a plurality of test points;
  one or more sensors that collect diagnostic data of the rotating machine from among the plurality of test points;
  a portable data collection and analysis device comprising a processor, a memory, an embedded camera, and a display;
  wherein said portable data collection and analysis device is configured to perform the steps of:
  for each one test point of the plurality of test points to be tested, receiving diagnostic data from a corresponding sensor unit among said plurality of sensor units into said memory;
  configuring the portable data collection and analysis device to represent the machine configuration of the identified rotating machine as a naive bayesian network which is independent of the received diagnostic data;
  for each one part of said plurality of select parts to be evaluated using said received diagnostic data,
  deriving a probability of presence of a potential fault for said one part based on the received diagnostic data and the naive bayesian network, said potential fault having one or more characteristic symptoms, and each one of said one or more characteristic symptoms having a symptom weight, and
  determining a confidence level C(i) for presence of said potential fault i for said one part as follows:

$$C(i) = 1 - \frac{\sum_{j \neq i} P_j \times \text{Similarity}(i, j)}{\sum_{j \neq i} P_j}$$

where $P_j$ is the derived probability of presence of potential fault j; and $$\text{Similarity}(i, j) = \frac{\text{InterCount}(i, j)}{\text{UnionCount}(i, j)}$$

where $$\text{InterCount}(i, j) = \sum_{k \in (S_i \cap S_j)} 1 - |w(i, k) - w(j, k)|$$

and $$\text{UnionCount}(i, j) = \|S_i\| + \|S_j\| - \text{InterCount}(i, j)$$

and
  where $w(i, k) \in [0,1]$ is the probability that characteristic symptom k of potential fault i is present;
  $\|S_i\|$ denotes the number of characteristic symptoms in the set $S_i$ of characteristic symptoms for the potential fault i; and
  $\|S_j\|$ denotes the number of characteristic symptoms in the set $S_j$ of characteristic symptoms for potential fault j,
  wherein a greater dis-similarity between sets of characteristic symptoms, as weighted, for said potential fault i and said potential faults for each other part of said select parts corresponds to a higher confidence level; and
  diagnosing that said one part has a corresponding deteriorating condition, when the probability of presence $P_j$ of said potential fault i for said one part exceeds a first prescribed threshold and the confidence level for the probability of presence $P_j$ of said potential fault i for said one part exceeds a second prescribed threshold.

11. The system of claim 10, wherein said one or more sensors comprise a first sensor unit removably mounted to the rotating machine so as to collect diagnostic data from a test point among the plurality of test points, the first sensor unit removably mounted at different locations on the machine to collect diagnostic data from differing test points among said plurality of test points.

12. The system of claim 10, further comprising a wire that connects a first sensor of said one or more sensors to the portable data collection and analysis device.

13. The system of claim 10, wherein the portable data collection and analysis device further comprises a pyrometer, and the pyrometer is a first sensor among said one or more sensors.

14. The system of claim 10, wherein the portable data collection and analysis device further comprises a stroboscope, and the stroboscope is a first sensor among said one or more sensors.

15. The system of claim 10, wherein the portable data collection and analysis device is configured to perform the further step of:
  displaying a recommendation to perform maintenance on said one part based on the diagnosis that said one part has a corresponding deteriorating condition.

16. The system of claim 10, wherein the portable data collection and analysis device is configured to perform the further step of:
   displaying a warning recommending that complementary analysis be performed when the probability of presence of said potential fault for said one part exceeds the first prescribed threshold and the corresponding confidence level does not exceed the second prescribed threshold.

17. The system of claim 10, wherein said diagnositc data comprises machine vibration data that represent sample measurements of vibration of the rotating machine.

18. The system of claim 10, wherein said diagnositc data comprises machine temperature data that represent sample measurements of temperature of the rotating machine.

* * * * *